United States Patent
Jehan

(10) Patent No.: US 9,904,506 B1
(45) Date of Patent: Feb. 27, 2018

(54) METHODS, PORTABLE ELECTRONIC DEVICES, COMPUTER SERVERS AND COMPUTER PROGRAMS FOR IDENTIFYING AN AUDIO SOURCE THAT IS OUTPUTTING AUDIO

(71) Applicant: Spotify AB, Stockholm (SE)

(72) Inventor: Tristan Jehan, Brooklyn, NY (US)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 15/352,444

(22) Filed: Nov. 15, 2016

(51) Int. Cl.
*G06F 3/00* (2006.01)
*G06F 17/00* (2006.01)
*G06F 3/16* (2006.01)
*H04W 4/02* (2018.01)
*H04L 29/08* (2006.01)

(52) U.S. Cl.
CPC .............. *G06F 3/16* (2013.01); *H04W 4/023* (2013.01); *H04L 67/12* (2013.01)

(58) Field of Classification Search
CPC .......... H04M 2250/10; H04N 21/4394; H04N 21/233; G06F 17/30743; H04W 4/023; H04W 4/025
USPC ....................... 381/56, 58; 455/414.1; 700/94
See application file for complete search history.

(56) References Cited

U.S. PATENT DOCUMENTS

| 8,830,792 B2 * | 9/2014 | Taylor | G01S 5/18 367/127 |
| 2014/0200694 A1 * | 7/2014 | Kennedy | H04H 60/27 700/94 |
| 2016/0174036 A1 | 6/2016 | Ruhstaller et al. | |

FOREIGN PATENT DOCUMENTS

| EP | 2388721 A1 | 11/2011 |
| WO | WO2009/042697 A2 | 4/2009 |

OTHER PUBLICATIONS

Spotify AB, Extended European Search Report, EP17201465.6, dated Jan. 5, 2018, 8 pgs.

* cited by examiner

*Primary Examiner* — Duc Nguyen
*Assistant Examiner* — Alexander Eljaiek
(74) *Attorney, Agent, or Firm* — Morgan, Lewis & Bockius LLP

(57) ABSTRACT

The present disclosure relates in general to media streaming, such as music streaming. In particular, this disclosure presents various embodiments of methods, portable electronic devices (200), computer servers (300) and computer program that allow for identifying an audio source (e.g., a music source) that is currently outputting audio (e.g., playing music). In an example scenario, this may allow a user to identify a social gathering such as a party where music is being played.

7 Claims, 9 Drawing Sheets

METHODS, PORTABLE ELECTRONIC DEVICES, COMPUTER SERVERS AND COMPUTER PROGRAMS FOR IDENTIFYING AN AUDIO SOURCE THAT IS OUTPUTTING AUDIO

TECHNICAL FIELD

The present disclosure generally relates to the provision of audio, such as streaming of audio. For example, the present disclosure thus also relates to the provision of music, such as streaming of music.

In particular, the embodiments described herein relate to methods, portable electronic devices, computer servers and computer programs for identifying an audio source (e.g., a music source) that is outputting audio (e.g., playing music).

BACKGROUND

As computer technology has improved, the digital media industry has evolved greatly in recent years. Users are able to use electronic devices such as portable electronic devices (e.g., cellular telephones, mobile telephones, smart phones, tablet computers (also known as tablets), etc.) to consume media such as audio, video, etc. For instance, users can listen to audio (e.g., music) and/or watch video (e.g., movies, television (TV) broadcasts, etc.) on a variety of portable electronic devices.

At the same time, advances in network technology have increased the speed and reliability with which information can be transmitted over computer networks. It is therefore possible for users to stream media over computer networks as needed, or on demand, rather than receiving a complete file in physical media (such as a CD, or downloading the entire file) before consuming the media.

At social gatherings such as parties, users often wish to share media with friends, relatives, and new acquaintances. For example, a party may access media on a portable electronic device, such as a mobile phone or a tablet computer, and present media content through a media presentation system (e.g., play music on one or several speakers).

SUMMARY

It is in view of the above considerations and others that the various embodiments disclosed herein have been made.

It is a general object of the embodiments described herein to allow for a way of identifying an audio source (e.g., a music source) that is outputting audio (e.g., playing music). In an example scenario, a user may be within a certain geographical area and may wish to join a certain social gathering such as a party where music is currently being played. A user may, for instance, wish to join this party for sharing his/her music taste, or music preferences, by proposing certain songs to be played at the party. The playing of songs from the playlist at the party itself could, e.g., be dynamically controlled.

The present disclosure recognizes the fact that it may, in some scenarios, be difficult for the user to identify which party is closest to his/her own geographical location, especially if there are several parties going on nearby the user's own location. In some existing scenarios, this difficulty may become even more challenging by the fact that different electronic devices use different operating systems (c.f., Android vs. iOS) and/or by the fact that certain Wi-Fi connectivity problems may sometimes be encountered by these devices. The present disclosure therefore recognizes that there is a need for a simpler way of identifying a party. Advantageously, this way of identifying a party should also be inexpensive.

The present disclosure also recognizes that, in some additional or alternative scenarios, a user who wants to influence the music played at a party typically joins the party. That is, not only joining the party in the physical sense, but also informing the computer server(s) (a.k.a. the streaming music server(s)) that the user's influence should affect the music, i.e. join the music streaming party. However, still other ways of allowing the user to join a party may be needed, for example, for situations when device-to-device communication using Bluetooth or WiFi cannot be easily established. If all currently streaming parties were offered to the user of the portable electronic device this would most likely be inconvenient for the user and, accordingly, there may be a need for an alternative way to offer a party, for example only one single party, for the user to join on his portable electronic device.

The general object of allowing for a way of identifying an audio source (e.g., a music source) that is outputting audio (e.g., playing music) has been addressed by the appended independent claims. Advantageous embodiments are defined in the appended dependent claims.

In a first of its aspects, this disclosure therefore presents a method performed by a portable electronic device (such as a cellular telephone, a mobile telephone, a smart phone, a tablet computer, or similar) for identifying an audio source that is outputting audio.

Position coordinates of the portable electronic device are determined (e.g., by means of a location-detection device/geo-location system). For example, the location-detection device comprises a Global Navigation Satellite System (GNSS) device (e.g., a Global Positioning System (GPS) device). In some embodiments, position coordinates of the portable electronic device are determined by measuring received signal strengths from transmitters (e.g., access points) with known locations and trilaterating. In some embodiments, position coordinates are determined using a commercially available geo-location service.

Furthermore, the position coordinates and an instruction to search for available audio sources within a predefined range of the position coordinates are sent, i.e. transmitted, from the portable electronic device to a computer server. In some embodiments, the position coordinates and instruction are sent using a first data message. The instruction may be an explicit instruction (e.g., included or otherwise incorporated into the first data message). Alternatively, the instruction may be an implicit instruction. For example, upon receipt by the computer server the computer server would recognize the first data message to represent an instruction to the computer server to search for available audio sources within a predefined range of the determined position coordinates position coordinates without any explicit instruction being included as such in the first data message.

Still further, audio is sampled by means of an audio-recording device in the portable electronic device during a sampling time period. The sampling time period may be a pre-determined sampling time period. That is, the length (e.g., in seconds) of the sampling time period may be pre-determined. In some embodiments, the audio-recording device may be a microphone.

The sampled audio is stored, by means of a storage device (e.g., a memory) in the portable electronic device, in an audio file together with a time stamp indicative of the earlier-mentioned sampling time period. The sampled audio does not have to be stored permanently. Instead, it may suffice that the sampled audio is stored temporarily, i.e. during a limited period of time (which may for example be pre-set).

Moreover, in some embodiments, said audio file is sent to the computer server. An instruction may also be sent to the computer server to compare the sampled audio included in the audio file with audio outputted by any one of the audio sources (e.g., available audio sources) found by the computer server to be within a predefined range of said position coordinates to see if a match can be found. For example, a second data message is sent to the computer server that includes said audio file and may include said instruction. The instruction may be an explicit instruction (e.g., which is included or otherwise incorporated into the second data message). Alternatively, the instruction may be an implicit instruction. For example, upon receipt by the computer server the computer server would recognize the second data message to represent an instruction to the computer server to compare the sampled audio included in the audio file with audio outputted by any one of the audio sources found by the computer server to be within a predefined range of said position coordinates to see if a match can be found.

It is conceivable, in some embodiments, that the above-mentioned first and second data messages could be combined into one single data message.

In some embodiments, the method may further comprise receiving a third data message from the computer server in response to the computer server finding a match, said third data message comprising information related to (e.g., specifying) which audio source outputting audio is closest to the portable electronic device.

In some embodiments, the method may further comprise receiving a fourth data message from the computer server, said fourth data message including a list of available audio sources outputting audio and within a predefined range of said position coordinates.

It is conceivable, in some embodiments, that the above-mentioned third and fourth data messages could be combined into one single data message.

In a second of its aspects, this disclosure presents a method performed by a computer server for identifying an audio source that is outputting audio. The method may advantageously be performed by one single computer server. Alternatively, however, the method may be performed by several computer servers in a distributed manner. If the method is performed by, or otherwise executed in, several computer servers, the different involved computer servers may perform different actions, or method steps, such that the method as described herein can be completed by the involved computer servers.

Position coordinates related to a position of the portable electronic device and an instruction to the computer server to search for available audio sources within a predefined range of said position coordinates are obtained (e.g., received) from a portable electronic device. For example, a first data message that includes said position coordinates and instruction is received from the portable electronic device. As described hereinabove, the instruction may be either an explicit instruction or an implicit instruction.

Furthermore, the method comprises searching for available audio sources within the predefined range of said position coordinates by utilizing the received position coordinates. In some embodiments, the searching for available audio sources may be conditionally performed such that the searching for available audio sources is performed in response to the computer server having received the above-mentioned first data message.

Based on the search, a list of available audio sources within a predefined range of said position coordinates can be determined.

The method further comprises receiving, from the portable electronic device, i) an audio file including sampled audio and a time stamp indicative of a sampling time period (e.g., predetermined sampling time period) during which audio has been sampled, and ii) an instruction to said computer server to compare the sampled audio included in the audio file with audio presented by any one of the audio sources of the determined list of available audio sources. For example, the audio file and instruction are received in a second data message. As described earlier hereinabove, this instruction may be either an explicit instruction or an implicit instruction.

In response to receiving the second data message, the sampled audio of the received audio file can be compared with audio outputted by any one of the audio sources of the determined list of available audio sources during a period of time that matches said time stamp.

In response to finding a match between the sampled audio of the received audio file with audio outputted by any one of the audio sources of the determined list of available audio sources during said period of time that matches said time stamp, a corresponding audio source is identified. In some embodiments, identifying the corresponding audio source comprises determining which audio source of the audio sources of the determined list of available audio sources is closest to the portable electronic device.

As will be appreciated, in some embodiments, the above-mentioned first and second data messages could be combined into one single data message.

In some embodiments, the method may further comprise sending a third data message to the portable electronic device. The third data message comprises information related to (e.g., specifying) which audio source outputting audio is closest to the portable electronic device.

In some embodiments, the method may further comprise sending a fourth data message to the portable electronic device, said fourth data message including a list of available audio sources outputting audio and within a predefined range of said position coordinates.

As will be appreciated, in some embodiments, the above-mentioned third and fourth data messages could be combined into one single data message.

In a third of its aspects, this disclosure presents a portable electronic device (such as a cellular telephone, a mobile telephone, a smart phone, a tablet computer, or similar). The portable electronic device comprises an audio-recording device (e.g., a microphone), a transmitter, at least one processor, and a storage device (e.g., memory), and may also comprise a location-detection device (e.g., a GNSS device such as a GPS). The storage device comprises (e.g., stores) instructions executable by the at least one processor to cause the portable electronic device to perform the method according to the first aspect described hereinabove. For example, the storage device may thus comprise (e.g., store) instructions executable by the at least one processor to cause the portable electronic device to: determine (e.g., by means of the location-detection device) position coordinates of the portable electronic device; send, by means of the transmitter, (e.g., in a first data message) to a computer server, position coordinates and an instruction to the computer server to search for available audio sources within a predefined range of said position coordinates; sample audio, by means of the audio-recording device, during a predetermined sampling time period; store, by means of a storage device (e.g., another storage device), the sampled audio in an audio file together with a time stamp indicative of said predetermined sampling time period; and send, by means of the transmitter, a second data message to the computer server, said second data message including said audio file and an instruction to said computer server to compare the sampled audio included in the audio file with audio outputted by any one of the audio sources found by the computer server to be within a predefined range of said position coordinates to see if a match can be found.

Again, in some embodiments, the above-mentioned first and second data messages could be combined into one single data message.

In some embodiments, the portable electronic device may further comprise a receiver adapted to receive a third data message from the computer server in response to the computer server finding a match, said third data message comprising information related to (e.g., specifying) which audio source outputting audio is closest to the portable electronic device.

In some embodiments, the portable electronic device may further comprise a receiver adapted to receive a fourth data message from the computer server, said fourth data message including a list of available audio sources outputting audio and within a predefined range of said position coordinates.

Again, in some embodiments, the above-mentioned third and fourth data messages could be combined into one single data message.

In a fourth of its aspects, this disclosure presents a computer server. The computer server comprises a receiver, at least one processor, and a storage device (e.g., memory) comprising (e.g., storing) instructions executable by the at least one processor to cause the computer server to perform the method according to the second aspect described hereinabove. For example, the storage device may thus comprise (i.e., store) instructions executable by the at least one processor to cause the computer server to receive, by means of the receiver, (e.g., in a first data message) from a portable electronic device, position coordinates related to a position of the portable electronic device and an instruction to the computer server to search for available audio sources within a predefined range of said position coordinates; search for available audio sources within the predefined range of said position coordinates by utilizing the received position coordinates; determine a list of available audio sources within the predefined range of said position coordinates; receive, using the receiver, (e.g., in a second data message) from the portable electronic device i) an audio file including sampled audio and a time stamp indicative of a predetermined sampling time period during which the sampled audio was sampled; and ii) an instruction to said computer server to compare the sampled audio included in the audio file with audio presented by any one of the audio sources of the determined list of available audio sources; in response thereto, compare the sampled audio of the received audio file with audio outputted by any one of the audio sources of the determined list of available audio sources during a period of time that matches said time stamp; and in response to finding a match between the sampled audio of the received audio file with audio outputted by any one of the audio sources of the determined list of available audio sources during said period of time that matches said time stamp, identify a corresponding audio source. In some embodiments, identifying the corresponding audio source comprises determining which audio source of the audio sources of the determined list of available audio sources is closest to the portable electronic device.

It should be recalled that, in some embodiments, the above-mentioned first and second data messages could possibly be combined into one single data message.

In some embodiments, the computer server may further comprise a transmitter adapted to send a third data message to the portable electronic device, said third data message comprising information related to (e.g., specifying) which audio source outputting audio is closest to the portable electronic device.

In some embodiments, the computer server may further comprise a transmitter adapted to send a fourth data message to the portable electronic device, said fourth data message including a list of available audio sources outputting audio and within a predefined range of said position coordinates.

It should be recalled that, in some embodiments, the above-mentioned third and fourth data messages could possibly be combined into one single data message.

In a fifth of its aspects, this disclosure presents a computer program, comprising (e.g., storing) instructions which, when executed on at least one processor, cause the at least one processor to carry out the method according to first aspect mentioned hereinabove. Also, a carrier comprising (e.g., storing) the computer program of the fifth aspect may be provided. The carrier may be any one of an electronic signal, an optical signal, a radio signal, or a computer readable storage medium. For example, a non-transitory computer readable storage medium may be provided. The non-transitory computer readable storage medium may store one or more sets of instructions for causing the at least one processor to: determine (e.g., by means of a location-detection device) position coordinates of the portable electronic device; send, by means of a transmitter, (e.g., in a first data message) to a computer server, said position coordinates and an instruction to the computer server to search for available audio sources within a predefined range of said position coordinates; sample audio, by means of an audio-recording device, during a predetermined sampling time period; store, by means of a storage device, the sampled audio in an audio file together with a time stamp indicative of said predetermined sampling time period; and send, by means of the transmitter, a second data message to the computer server, said second data message including said audio file and an instruction to said computer server to compare the sampled audio included in the audio file with audio outputted by any one of the audio sources found by the computer server to be within a predefined range of said position coordinates to see if a match can be found.

In a sixth of its aspects, this disclosure presents a computer program, comprising (e.g., storing) instructions which, when executed on at least one processor, cause the at least one processor to carry out the method according to the second aspect mentioned hereinabove. Also, a carrier comprising (e.g., storing) the computer program to the sixth aspect may be provided. The carrier may be any one of an electronic signal, an optical signal, a radio signal, or a computer readable storage medium. For example, a non-transitory computer readable storage medium may be provided. The non-transitory computer readable storage medium may store one or more sets of instructions for causing at least one processor to receive, by means of a receiver, (e.g., in a first data message) from a portable electronic device, position coordinates related to a position of the portable electronic device and an instruction to the computer server to search for available audio sources within a predefined range of said position coordinates; search for available audio sources within the predefined range of said position coordinates by utilizing the received position coordinates; determine a list of available audio sources within the predefined range of said position coordinates; receive, by means of the receiver, (e.g., in a second data message) from the portable electronic device, i) an audio file including sampled audio and a time stamp indicative of a predetermined sampling time period during which the sampled audio was sampled; and ii) an instruction to said computer server to compare the sampled audio included in the audio file with audio presented by any one of the audio sources of the determined list of available audio sources; in response thereto, compare the sampled audio of the received audio file with audio outputted by any one of the audio sources of the determined list of available audio sources during a period of time that matches said time stamp; and in response to finding a match between the sampled audio of the received audio file with audio outputted by any one of the audio sources of the determined list of available audio sources during said period of time that matches said time stamp, identify a corresponding audio source. In some embodiments, identifying the corresponding audio source comprises determining which audio source of the audio sources of the determined list of available audio sources is closest to the portable electronic device.

In a seventh of its aspects, this disclosure presents a method performed by a portable electronic device (such as a cellular telephone, a mobile telephone, a smart phone, a tablet computer, or similar) for identifying an audio source that is outputting audio.

Position coordinates of the portable electronic device are determined, e.g. by means of a location-detection device (such as a GNSS device).

Furthermore, audio is sampled in order to generate an audio sample. For example, the audio may be sampled by means of an audio-recording device. In some embodiments, the audio-recording device may be a microphone.

Still further, in some embodiments, the audio sample is converted into a fingerprint. The fingerprint may be referred to as an audio sample fingerprint.

Moreover, the position coordinates and the fingerprint are sent, i.e. transmitted, to a computer server. In some embodiments, the position coordinates and the fingerprint are sent in a first data message. An instruction to the computer server to search for available audio sources on the basis of said position coordinates as well as said fingerprint may also be sent to the computer server (e.g., using the first data message). In some embodiments, the first data message constitutes an instruction to the computer server to search for available audio sources on the basis of said position coordinates as well as said fingerprint. In other words, the instruction may be seen as an implicit instruction. In alternative embodiments, the first data message may incorporate the instruction as an explicit instruction in said first data message.

In some embodiments, the method may further comprise receiving a second data message from the computer server in response to the computer server finding a match based on the position coordinates as well as the fingerprint. The second data message may comprise information related to (e.g., specify) which audio source outputting audio is closest to the portable electronic device.

In an eighth of its aspects, this disclosure presents a method performed by a computer server for identifying an audio source that is outputting audio. The method may advantageously be performed by one single computer server. Alternatively, however, the method may be performed by several computer servers in a distributed manner. If the method is performed by, or otherwise executed in, several computer servers, the different involved computer servers may perform different actions, or method steps, such that the method as described herein can be completed by the involved computer servers.

Position coordinates related to a position of the portable electronic device and a fingerprint representing an audio sample are received from a portable electronic device (e.g., in a first data message).

The method further comprises searching for available audio sources within the predefined range of said position coordinates by utilizing the received position coordinates.

A list of available audio sources within the predefined range of said position coordinates is also determined.

The method further comprises comparing the received fingerprint with fingerprints of corresponding audio samples of the determined list of available audio sources.

Furthermore, in response to finding a match between the received fingerprint and any one of the fingerprints of corresponding audio samples of the determined list of available audio sources, a corresponding audio source is identified. In some embodiments, identifying the corresponding audio source comprises determining which audio source of the audio sources of the determined list of available audio sources is closest to the portable electronic device.

In some embodiments, the method may further comprise sending, i.e. transmitting, a second data message from the computer server in response to the computer server finding a match. This second data message may comprise information related to (e.g., specifying) which audio source outputting audio is closest to the portable electronic device.

In a ninth aspect of its aspects, this disclosure presents a portable electronic device (such as a cellular telephone, a mobile telephone, a smart phone, a tablet computer, or similar). The portable electronic device may comprise a location-detection device (e.g., a GNSS device), an audio-recording device (e.g., a microphone), a transmitter, at least one processor, and a storage device (e.g., memory). The memory comprises (i.e., stores) instructions executable by the at least one processor to cause the portable electronic device to perform the method according to the seventh aspect described hereinabove. For example, the memory may thus comprise (e.g., store) instructions executable by the at least one processor to cause the portable electronic device to determine (e.g., by means of the location-detection device) position coordinates of the portable electronic device; sample audio, by means of the audio-recording device, to generate an audio sample; convert the audio sample into a fingerprint; and send (e.g., in a first data message) to a computer server said position coordinates, the fingerprint, and an instruction to the computer server to search for available audio sources on the basis of said position coordinates as well as said fingerprint. In some embodiments, the first data message constitutes the instruction.

In some embodiments, the portable electronic device may also comprise a receiver adapted to receive a second data message from the computer server in response to the computer server finding a match based on the position coordinates as well as the fingerprint, said second data message comprising information related to (e.g., specifying) which audio source outputting audio is closest to the portable electronic device.

In a tenth of its aspects, this disclosure presents a computer server. The computer server comprises a receiver, at least one processor, and a storage device (e.g., memory). The storage device comprises (e.g., stores) instructions executable by the at least one processor to cause the computer server to perform the method according to the eighth aspect described hereinabove. For example, the storage device may thus comprise (e.g., store) instructions executable by the at least one processor to cause the computer server to receive, by means of the receiver, (e.g., in a first data message) from a portable electronic device, position coordinates related to a position of the portable electronic device as well as a fingerprint representing an audio sample; search for available audio sources within a predefined range of said position coordinates by utilizing the received position coordinates; determine a list of available audio sources within the predefined range of said position coordinates; compare the received fingerprint with fingerprints of corresponding audio samples of the determined list of available audio sources; and in response to finding a match between the received fingerprint with any one of the fingerprints of corresponding audio samples of the determined list of available audio sources, identify a corresponding audio source. In some embodiments, identifying the corresponding audio source comprises determining which audio source of the audio sources of the determined list of available audio sources is closest to the portable electronic device.

In some embodiments, the computer server may also comprise a transmitter adapted to transmit a second data message from the computer server in response to the computer server finding a match, said second data message comprising information related to (e.g., specifying) which available audio source is closest to the portable electronic device.

In an eleventh aspect of its aspects, this disclosure presents a computer program comprising (i.e., storing) instructions which, when executed on at least one processor, cause the at least one processor to carry out the method according to the seventh aspect mentioned hereinabove. Also, a carrier comprising (e.g., storing) the computer program of the eleventh aspect may be provided. The carrier may be any one of an electronic signal, an optical signal, a radio signal, or a computer readable storage medium. For example, a non-transitory computer readable storage medium may be provided. The non-transitory computer readable storage medium may store one or more sets of instructions for causing at least one processor to determine (e.g., by means of a location-detection device) position coordinates of the portable electronic device; sample audio, by means of an audio-recording device, to generate an audio sample; convert the audio sample into a fingerprint; and send (e.g., in a first data message) to a computer server said position coordinates as well as the fingerprint. In some embodiments, said first data message constitutes an instruction to the computer server to search for available audio sources on the basis of said position coordinates as well as said fingerprint.

In a twelfth aspect of its aspects, this disclosure presents a computer program comprising (e.g., storing) instructions which, when executed on at least one processor, cause the at least one processor to carry out the method according to the eighth aspect mentioned hereinabove. Also, a carrier comprising (e.g., storing) the computer program of the twelfth aspect may be provided. The carrier may be any one of an electronic signal, an optical signal, a radio signal, or a computer readable storage medium. For example, a non-transitory computer readable storage medium may be provided. The non-transitory computer readable storage medium may store one or more sets of instructions for causing at least one processor to receive, by means of a receiver, (e.g., in a first data message) from a portable electronic device, position coordinates related to a position of the portable electronic device as well as a fingerprint representing an audio sample; search for available audio sources within the predefined range of said position coordinates by utilizing the received position coordinates; determine a list of available audio sources within a predefined range of said position coordinates; compare the received fingerprint with fingerprints of corresponding audio samples of the determined list of available audio sources; and in response to finding a match between the received fingerprint with any one of the fingerprints of corresponding audio samples of the determined list of available audio sources, identify a corresponding audio source. In some embodiments, identifying the corresponding audio source comprises determining which audio source of the audio sources of the determined list of available audio sources is closest to the portable electronic device.

Various embodiments described herein are advantageous in that they allow for a way of identifying an audio source that is currently outputting audio. In an example use case scenario, this may allow for a user to identify, or otherwise locate, a certain social gathering such as a party. Embodiments herein propose a solution where audio recognition (or, audio fingerprinting (e.g., musical fingerprinting)) is used in combination with positioning in order to identify the audio source that is currently outputting audio. By utilizing the position of the portable electronic device, it is possible to reduce the search space when identifying audio that matches sampled audio. This allows for a relatively quick search and hence a user may identify an audio source that is currently outputting audio (e.g., playing music) relatively quickly.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

Figure 1:
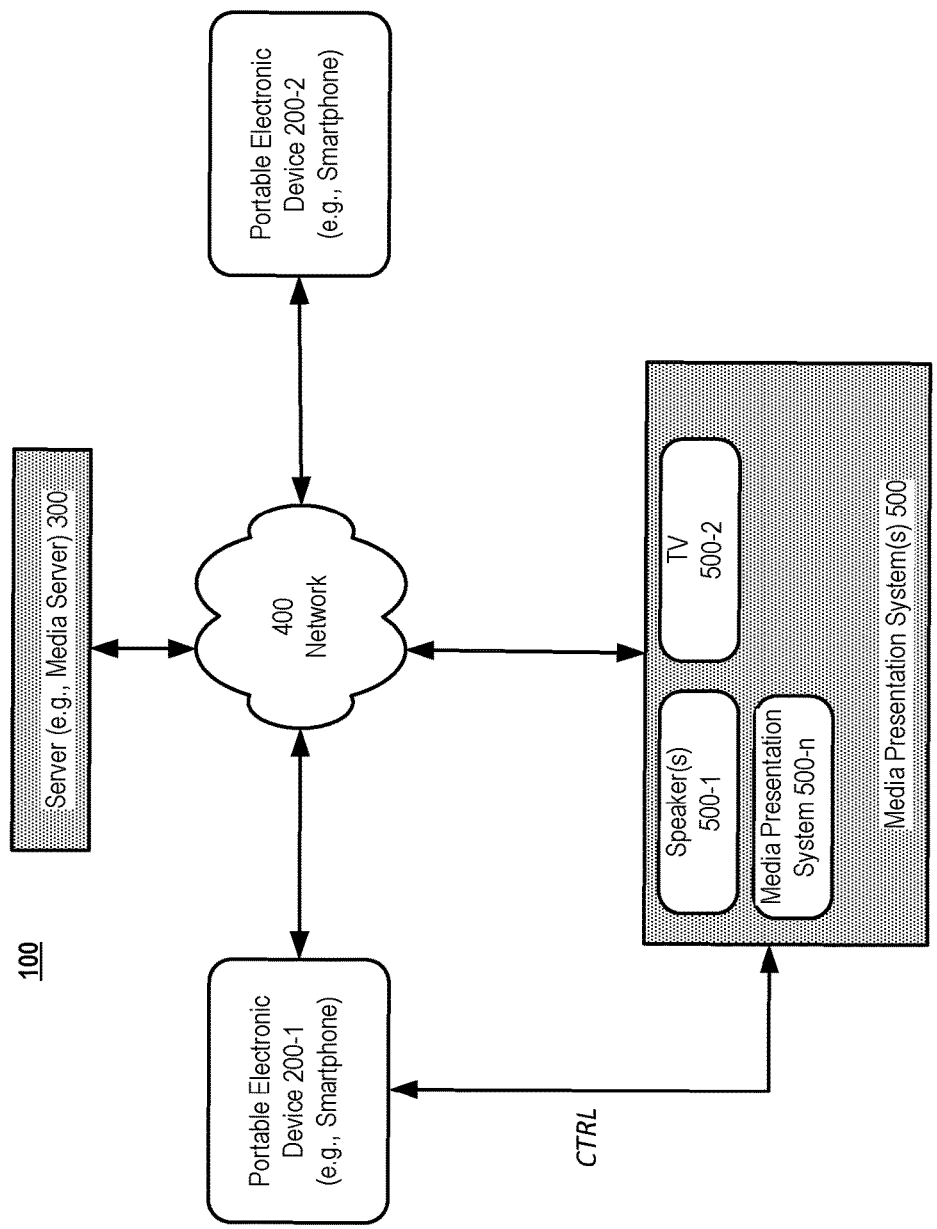
FIG. 1 is a block diagram schematically illustrating an exemplary media content delivery system in accordance with some embodiments.

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout this description.

As described earlier, some existing solutions for the provision of audio do not allow for identifying an audio source that is currently playing, i.e. currently outputting audio.

Therefore, it is a general object of the embodiments described in this disclosure to allow for a way of identifying an audio source (e.g., a music source) that is outputting audio (e.g., playing music).

In an example scenario, a user may be within a certain geographical area and may wish to join a certain social gathering, e.g. a party, where music is currently being played. The present disclosure recognizes the fact that, in some scenarios, it may be difficult for the user to identify which party is closest to his/her own geographical location, especially if there are several parties going on nearby the user's own location. The present disclosure therefore recognizes that there is a need for a simpler way of identifying, or otherwise locating, a party. Advantageously, this way of identifying a party should also be inexpensive. Again, the present disclosure also recognizes that, in some additional or alternative scenarios, a user who wants to influence the music played at a party typically joins the party. That is, not only joining the party in the physical sense, but also informing the computer server(s) (a.k.a. the streaming music server(s)) that the user's influence should affect the music, i.e. join the music streaming party. However, still other ways of allowing the user to join a party may be needed, for example, for situations when device-to-device communication using Bluetooth or WiFi cannot be easily established. If all currently streaming parties were offered to the user of the portable electronic device this would most likely be inconvenient for the user and, accordingly, there may be a need for an alternative way to offer a party, preferably only one single, for the user to join on his portable electronic device.

To address the above-mentioned general object, in accordance with some embodiments, described herein are methods, electronic devices, computer servers and computer programs for identifying an audio source that is outputting audio.

For instance, in one example embodiment, a portable electronic device (such as a mobile telephone or a tablet computer) determines position coordinates of the portable electronic device. In other words, the portable electronic device is operable to determine its position, or location. Also, audio is sampled to generate an audio sample. The audio sample is converted into a fingerprint, hereinafter also referred to as an audio fingerprint, by compressing the audio sample into a code. Still further, said position coordinates and the fingerprint are sent, i.e. transmitted, to a computer server and the computer server is instructed to search for available audio sources on the basis of said position coordinates and the fingerprint. In some embodiments, sending the said position coordinates and the fingerprint comprises sending a first data message, wherein the first data message includes said position coordinates as well as the fingerprint. The first data message may constitute an instruction to the computer server to search for available audio sources on the basis of said position coordinates as well as said fingerprint. The computer server obtains the first data message. For example, the computer server may receive the first data message directly from the portable electronic device. In response to obtaining the first data message, the computer server may be operable to search for available audio source(s) within a predefined range of said position coordinates by utilizing the received position coordinates and determine a list of available audio sources within the predefined range of said position coordinates. Furthermore, the computer server may be operable to compare the received fingerprint with fingerprints of corresponding audio samples of the determined list of available audio sources. In response to finding a match between the received fingerprint and any one of the fingerprints of corresponding audio samples of the determined list of available audio sources, the computer server may identify a corresponding audio source. In some embodiments, identifying the corresponding audio source comprises determining which audio source of the audio sources of the determined list of available audio sources is closest to the portable electronic device.

As will be appreciated, audio fingerprinting (e.g., musical fingerprinting) may advantageously be used in combination with positioning in order to identify the audio source that is currently outputting audio. By utilizing the position of the portable electronic device, it is possible to reduce the search space when identifying audio that matches the sampled audio. This allows for a relatively quick search and hence a user may identify the audio source that is currently outputting audio relatively quickly.

In order to give context to the various embodiments described in this disclosure, FIG. 1 schematically illustrates an exemplary media content delivery system 100. The media content delivery 100 may comprise one or several portable electronic devices 200 (e.g., first portable electronic device 200-1 and second portable electronic device 200-2), one or more servers 300 (e.g., computer server(s) such as media content server(s) (sometimes referred to as media server(s))), and one or more media presentation systems (e.g., media presentation systems 500 including speaker(s) 500-1, television (TV) 500-2, and/or other media presentation systems 500-n).

In some embodiments, a portable electronic device 200 may be a mobile telephone, such as a smart phone. Alternatively, the portable electronic device 200 may be a tablet computer. In yet other embodiments, the portable electronic device 200 may be any other portable electronic device capable of playback of media content such as, for example, one of the portable electronic devices of the following group: a personal computer, a desktop computer, a laptop computer, and an electronic media device (e.g. a handheld entertainment device, a digital media player, or other handheld media device).

One or several networks (e.g., network(s) 400) may communicatively connect each component of the media content delivery system 100 with other components of the media content delivery system 100. The network(s) 400 may include public communications networks, private communication networks or a combination of both public and private communication networks. For example, the networks(s) may include any network(s) such as the Internet, other wide area networks (WAN), wireless wide area networks (WWAN), local area networks (LAN), wireless local area networks (WLAN), virtual private networks (VPN), metropolitan area networks (MAN), peer-to-peer networks, and/or ad-hoc networks. As will also be appreciated, the network(s) 400 may thus comprise cellular telecommunications network(s) and/or non-cellular network(s).

In some embodiments, as is illustrated in FIG. 1, a portable electronic device 200 (e.g., the first portable electronic device 200-1 in the following example) may be capable of remotely controlling one or more of the media presentation systems 500. To this end, the first portable electronic device 200-1 may for example implement, or otherwise utilize, any of the techniques described in U.S. Pat. No. 9,195,383 B2. For example, it is possible for a user of the first portable electronic device 200-1 to remotely control the presentation of media at any one or a combination of the media presentation systems 500. U.S. Pat. No. 9,195,383 B2 is incorporated herein by reference in its entirety.

Figure 2:
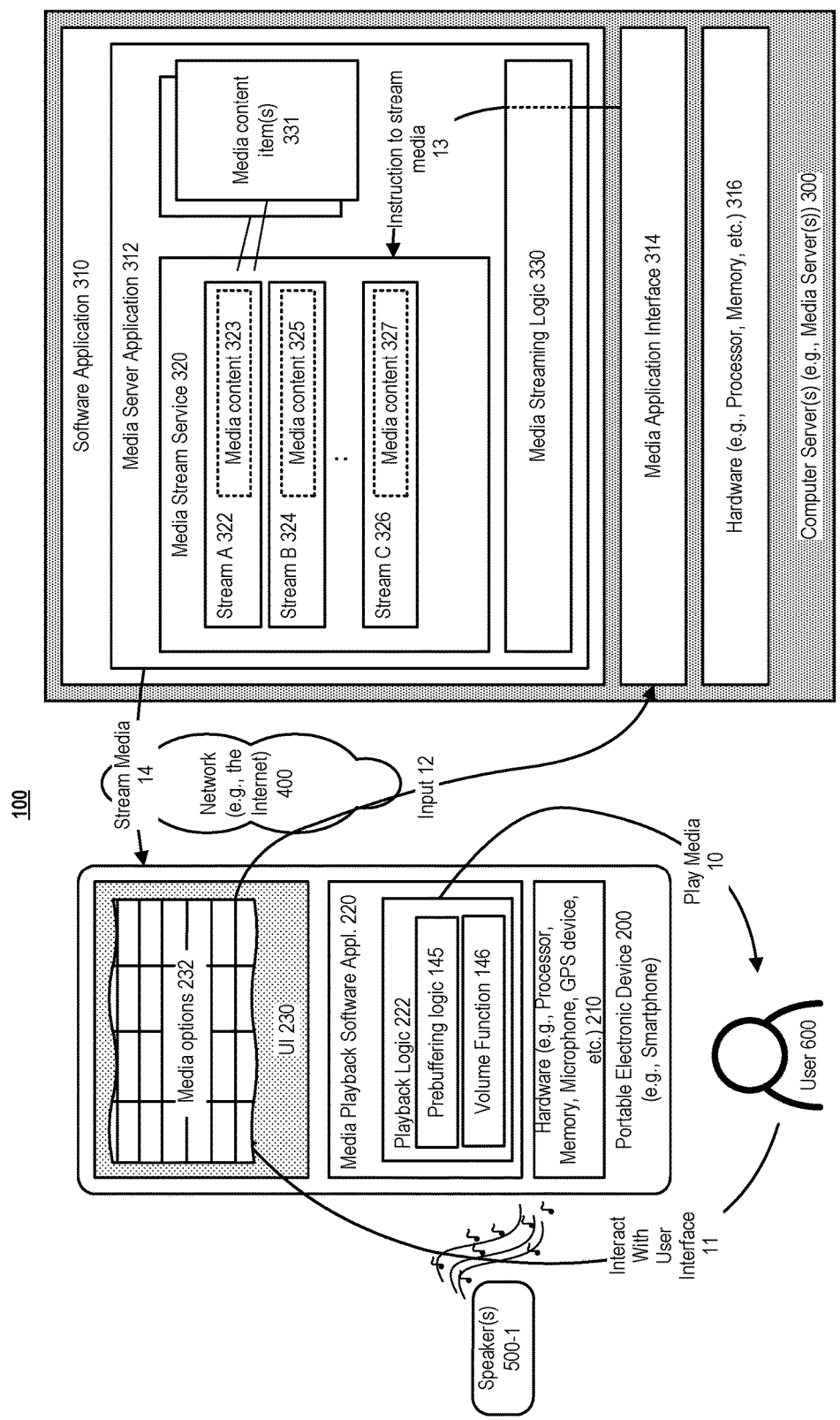
FIG. 2 illustrates an example of streaming of a media content from a computer server(s) to a portable electronic device.

Turning now to FIG. 2, an example environment where some embodiments of this disclosure may be applied will be described. A portable electronic device 200 (e.g. the second portable electronic device 200-2 of FIG. 1) may be communicatively connectable to the computer server 300 via the network(s) 400, e.g. the Internet, as described hereinabove. As can be seen in FIG. 2, only a single portable electronic device 200-2 and a single server 300 are shown. However, the server 300 may support the simultaneous use of multiple portable electronic devices 200-1, 200-2, etc., and/or the second electronic device 200-2 can simultaneously access media from multiple servers 300. Although FIG. 2 illustrates the computer server 300 in accordance with one example embodiment, FIG. 2 is intended more as a functional description of the various features, or components, which may be present in one or more servers, rather than a structural schematic of the various implementations described throughout this disclosure. In practice, and as recognized by persons skilled in the art, components shown separately could be combined and some components could be separated.

In the following description and in order not to obscure the detailed description with unnecessary detail, the media will in general be exemplified to be audio, e.g. music. This should, however, not be interpreted as limiting the scope of the various embodiments of the disclosed embodiments.

As is schematically shown in FIG. 2, the portable electronic device 200 (e.g., the first or second portable electronic devices 200-1, 200-2 shown in FIG. 1) may be used for the playback of media (e.g., audio such as music), which is provided by the computer server 300. The portable electronic device 200 may include one or several physical computer resources, or hardware resources 210. The hardware resources 210 may e.g. include one or several processors, a communications interface and one or several storage devices such as memories. Likewise, the computer server 300 operating as a media server may include one or several physical computer resources, or hardware resources 316. The hardware resources 316 may likewise include e.g. include one or several processors, a communications interface and one or several storage devices such as memories.

The computer server 300 may include an operating system or other processing system which supports execution of a software application 310, including a media server application 312 which may be used, for example, to stream media such as audio (e.g., music). A media stream service 320 may be used to buffer media content for streaming to one or more media streams 322, 324, and 326. A media application interface 314 may receive requests from electronic devices 200 or other systems, to retrieve media content 331 from the server 300.

Media content items 331 may be provided, for example, within a storage device such as a memory (e.g., including a database), or may be received by the computer server 300 from another source (not shown). This other source (not shown) could be external to the computer server 300, i.e. it may be located remotely from the server 300.

A media streaming logic 330 may be used to retrieve or otherwise access the media content items 331 in response to requests from portable electronic devices 200 or other systems, and populate the media stream service with streams 322, 324, 326 of corresponding media content 323, 325, 327 that may be returned, i.e. streamed, to the requesting portable electronic device 200 (or to a media presentation system 500).

The portable electronic device 200 may also comprise a user interface 230. The user interface 230 may, among other things, be adapted to display or otherwise provide a visual array of media options 232 and to determine user input. The visual array of media options 232 may for example be provided as a two-dimensional grid, a list, or any other visual array format. Each media option in the visual array of media options 232 may correspond to a respective media stream 322, 324, 326.

Selecting a particular media option within the visual array 232 may be used, or otherwise interpreted, as a request or instruction to the media server application 312 to stream or otherwise return a corresponding particular media item. For example, in accordance with some embodiments, the software application 310 at the server 300 may be used to stream or otherwise communicate media content to the electronic device 200 (or to a media presentation system 500), wherein the user interface 230 at the electronic device 200 is adapted to display a plurality of media options that correspond to respective media streams.

In accordance with some embodiments, the portable electronic device 200 may also include a media playback application 220, e.g. together with a playback logic 222, pre-buffering logic 145, and a volume function 146, which may be used to control the playback of media content is received from the media server application 312, for playback by the portable electronic device 200 (or by a media presentation system 500).

A user 600 may interact 11 with the user interface 230 of the electronic device 200 and issue requests, for example the playing of a selected media option. The user's selection of a particular media option may be communicated 12 to the media server application 312, via the media application interface 314. The media server application 312 may then be instructed 13 to stream corresponding media 13, including one or more streams of media content data 323, 325, 327, and subsequently stream 14 or otherwise communicate the selected media to the user's portable electronic device 200. In accordance with some embodiments, pre-buffering requests from the portable electronic device 200 may also be communicated 12 to the media server application 312 via the media application interface 314. At the portable electronic device 200, in response to the user's interaction with the user interface 230, the media playback application 220, including the playback logic 222, may play 10 the requested media content to the user 600. Alternatively, the user's interaction with the user interface 230 may cause playback of the requested media content by a media presentation system 500.

Figure 3A:
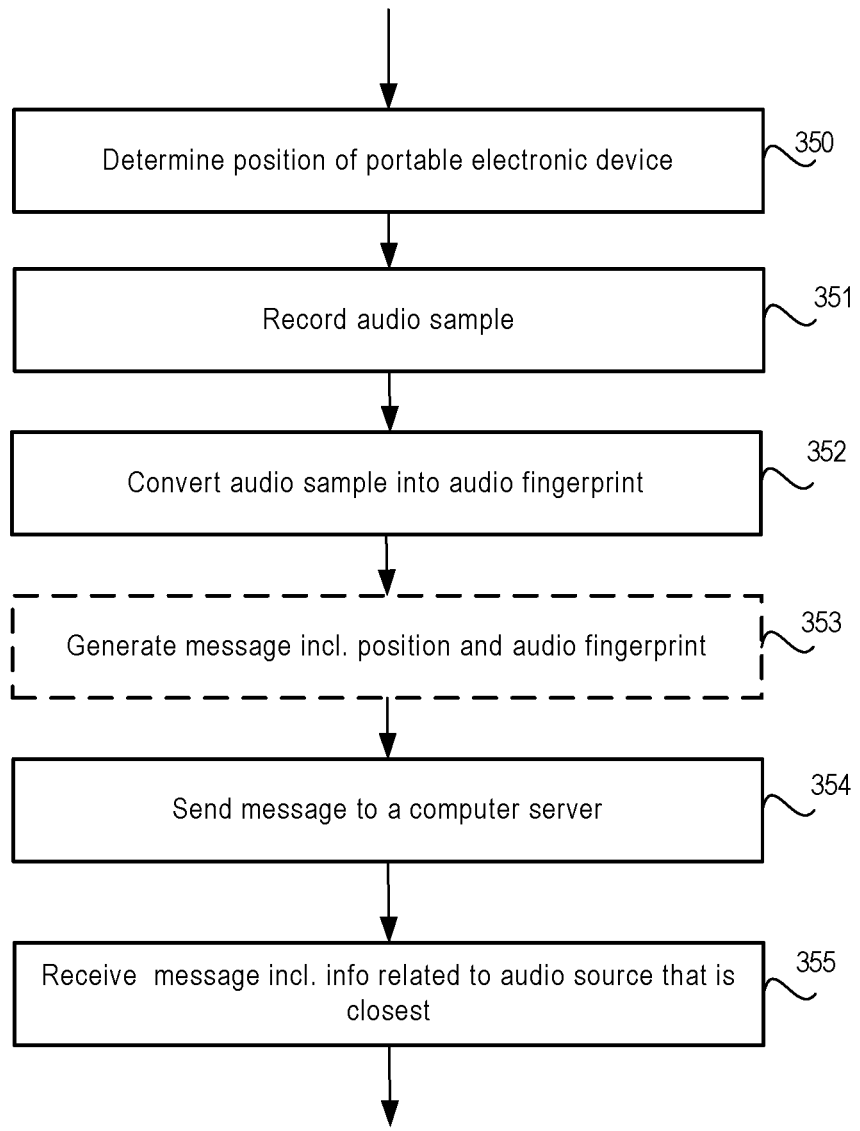
FIG. 3A schematically illustrates a flowchart of a method performed by a portable electronic device in accordance with an embodiment.
Figure 3B:
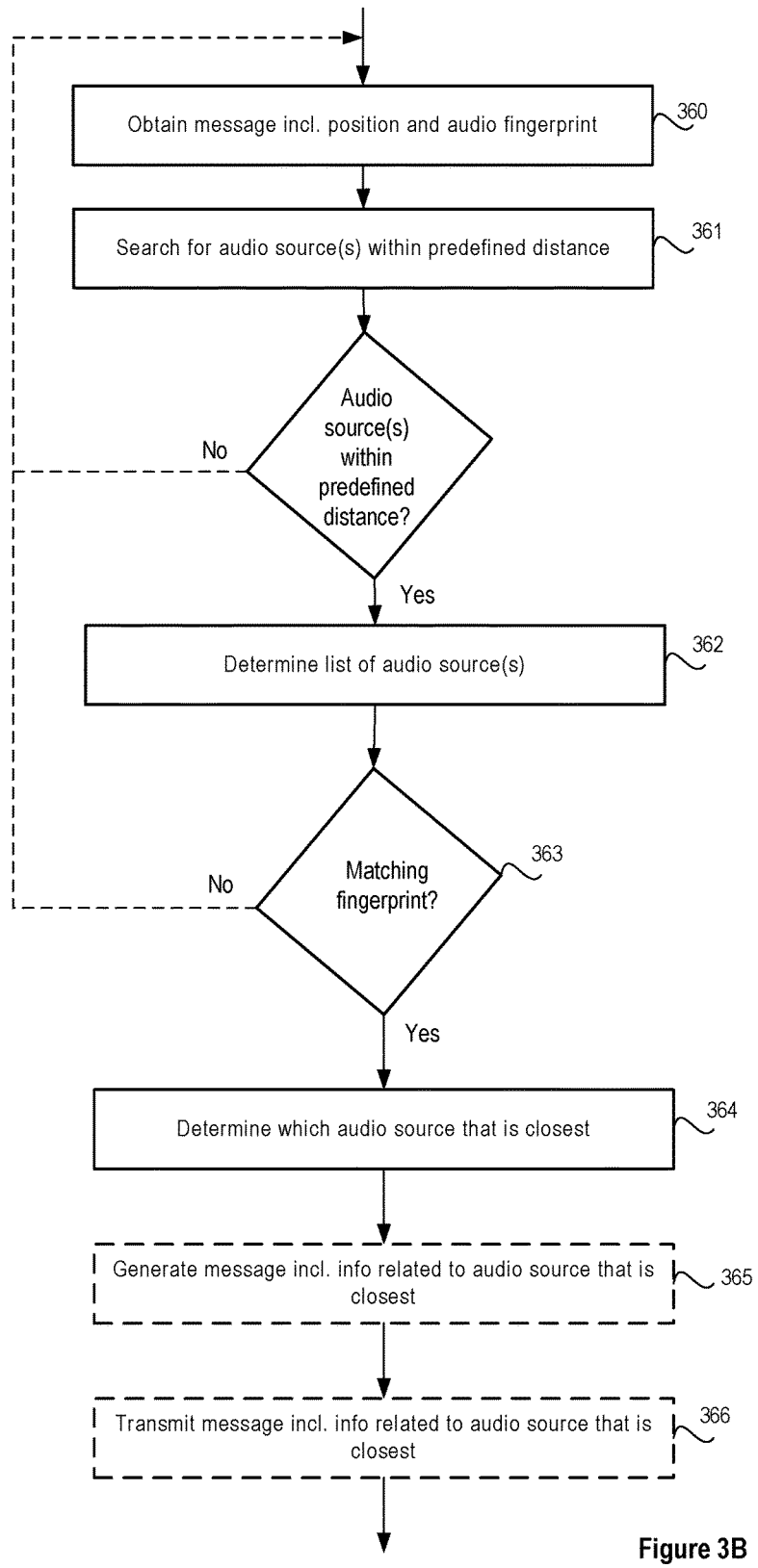
FIG. 3B schematically illustrates a flowchart of a method performed by a computer server in accordance with an embodiment.

Reference is now made to FIGS. 3A and 3B, which relate to methods for identifying an audio source that is outputting audio in accordance with one embodiment.

FIG. 3A is a flowchart of a method performed by, or otherwise executed in, a portable electronic device 200. The actions, or method steps, of this method will now be described in more detail.

Action 350: Position coordinates of the portable electronic device are determined, or otherwise calculated. For example, the position coordinates may be determined by means of a location-detection device (i.e., geo-location system) of the portable electronic device. In some embodiments, the location-detection device comprises a GNSS device. A GNSS (e.g., GPS) device is adapted to determine position coordinates of the portable electronic device utilizing a GNSS system (e.g., GPS). As will be appreciated, other geo-location techniques may additionally, or alternatively, be utilized for determining the location, or position, of the portable electronic device.

It should be recognized that various techniques are at the disposal for determining a position and, accordingly, the position coordinates of the portable electronic device. As is known and conventional in the art, a position of the portable electronic device may be determined by network-based, device-based, and WiFi-based location techniques or by hybrid techniques combining one or more of the network-based, device-based, and WiFi-based location techniques. Various techniques for determining a position and, accordingly, the position coordinates of a portable electronic device are known per se and will therefore not be further detailed herein.

Action 351: Audio is sampled to generate, or otherwise create, an audio sample. For example, the audio may be sampled by means of an audio-recording device, or audio recorder. In other words, the audio recording device is adapted to record audio to produce the audio sample. In some embodiments, the audio-recording device comprises a microphone.

Action 352: The audio sample is converted into a fingerprint, sometimes also referred to as an audio fingerprint. In other words, a fingerprint of the audio sample may be developed, or otherwise produced. The audio fingerprinting per se may be performed in various ways. As one example, the audio fingerprinting may be performed in accordance with any one of the techniques described in the U.S. Pat. No. 8,492,633 B2, entitled "Musical fingerprinting," which is incorporated herein by reference in its entirety.

Action 353: A first data message may be created, or otherwise produced. The first data message may include the position coordinates that were determined in action 310. Additionally, the data message may include the fingerprint that was generated in action 320. Alternatively, the position coordinates and the fingerprint may be included in separate data messages.

Action 354: The position coordinates and the fingerprint are sent, i.e. transmitted, to a computer server. In some embodiments, sending the position coordinates and the fingerprint comprises sending the first data message, the first data message including the position coordinates and the fingerprint. In some embodiments, the first data message constitutes an instruction to the computer server to search for available audio sources on the basis of the included position coordinates as well as said fingerprint. In other words, the instruction may be seen as an implicit instruction. In alternative embodiments, the first data message may incorporate the instruction as an explicit instruction in said first data message.

Reference is now made to FIG. 3B, which schematically illustrates a flowchart of a method performed by, or otherwise executed in, a computer server. The actions, or method steps, of this method will now be described in more detail. As will be appreciated, the method may be performed by one single computer server. Alternatively, however, the method may be performed by several computer servers in a distributed manner. If the method is performed by, or otherwise executed in, several computer servers, the different involved computer servers may perform different actions, or method steps, such that the method can be completed by the involved computer servers.

Action 360: The position coordinates and the fingerprint are obtained. For example, the position coordinates and the fingerprint may be obtained by receiving the first data message from the portable electronic device. As mentioned earlier, the first data message includes position coordinates related to a position of the portable electronic device as well as a fingerprint representing an audio sample.

Action 361: In response to obtaining the position coordinates and the fingerprint (e.g., receiving the first data message), available audio source(s) within the predefined range of said position coordinates may be searched by utilizing the obtained position coordinates.

In some embodiments, the computer server comprises a storage device including, e.g., a database. The database may include a library of audio sources including none, one or several audio source(s) that is/are currently outputting audio, e.g. playing music. Each one of the audio source(s) in said library of audio source(s) may be indexed with a value indicative of its respective location (i.e., position) in the database.

Furthermore, the database may include a library of audio items, e.g. music. Thus, the database may comprise (e.g., store) a large plurality of audio items. Each one of the stored audio items may have a fingerprint representing the stored audio item in question. The fingerprints may be stored in the database (e.g., in association with their respective audio items).

Action 362: On the basis of the search in action 361, a list of available audio sources within the predefined range of said position coordinates, i.e. within a certain range or distance from the portable electronic device from which the first data message is obtained, is determined or otherwise generated. In the example shown in FIG. 3B, action 362 is performed conditionally on the basis of the search. In other words, the method continues to action 362 only in response to at least one audio source having been found during the search. In this example, the list of available audio sources will include one or several available audio sources within the predefined range of said position coordinates. In the event no available audio source is found during the search, the method may optionally return to its starting point again. In an alternative embodiment, a list of available audio sources within the predefined range of said position coordinates is always determined or generated. In these alternative embodiments, the list of available audio sources may thus include none, one, or several available audio sources within the predefined range of said position coordinates, i.e. within a certain range or distance from the portable electronic device from which the first data message is obtained.

Action 363: Furthermore, the received fingerprint may be compared with fingerprints of corresponding audio samples of the determined list of available audio sources. Since audio source(s) are indexed by their location, it is not necessary to compare the received fingerprint with fingerprints of all audio items. As described earlier, the storage device of the computer server may comprise (e.g., store) a large plurality of audio items (e.g., music) and comparing a received fingerprint against all these stored fingerprint would probably consume much time. This, in turn, would potentially have a negative impact on the user experience. As a consequence of limiting the search space to only those audio source(s) that are within a certain, pre-defined, range or distance from the portable electronic device, the task of comparing fingerprints for identifying a matching fingerprint is far less time consuming.

Action 364: In response to finding a match between the received fingerprint and a fingerprint of any one of the fingerprints of corresponding audio samples of the determined list of available audio sources, it is determined which audio source of the audio sources of the determined list of available audio sources is closest to the portable electronic device.

By combining location and audio fingerprinting it is made possible to identify an audio source currently outputting audio (e.g., playing music) with a relatively good precision. At the same time, the task of identifying the audio source is relative quick. This may be important for the overall user experience, e.g., in a use case scenario where a user wishes to identify a social gathering (e.g., a party) nearby.

Action 365: A second data message may be created, or otherwise produced. The second data message may include information related to which audio source outputting audio is closest to the portable electronic device, in accordance with the determination in action 364.

Action 366: The second data message may be transmitted to the portable electronic device.

Turning now back to FIG. 3A, it will be appreciated that the second data message may be received by the portable electronic device.

Action 355: The second data message is obtained. For example, the second data message may be received from the computer server. Accordingly, a user of the portable electronic device may be informed about which audio source outputting audio is closest to the portable electronic device.

It will be appreciated that the actions, or method steps, described in connection with FIGS. 3A and 3B do not necessarily have to be performed or executed in the exact order as exemplified hereinabove.

Figure 4A:
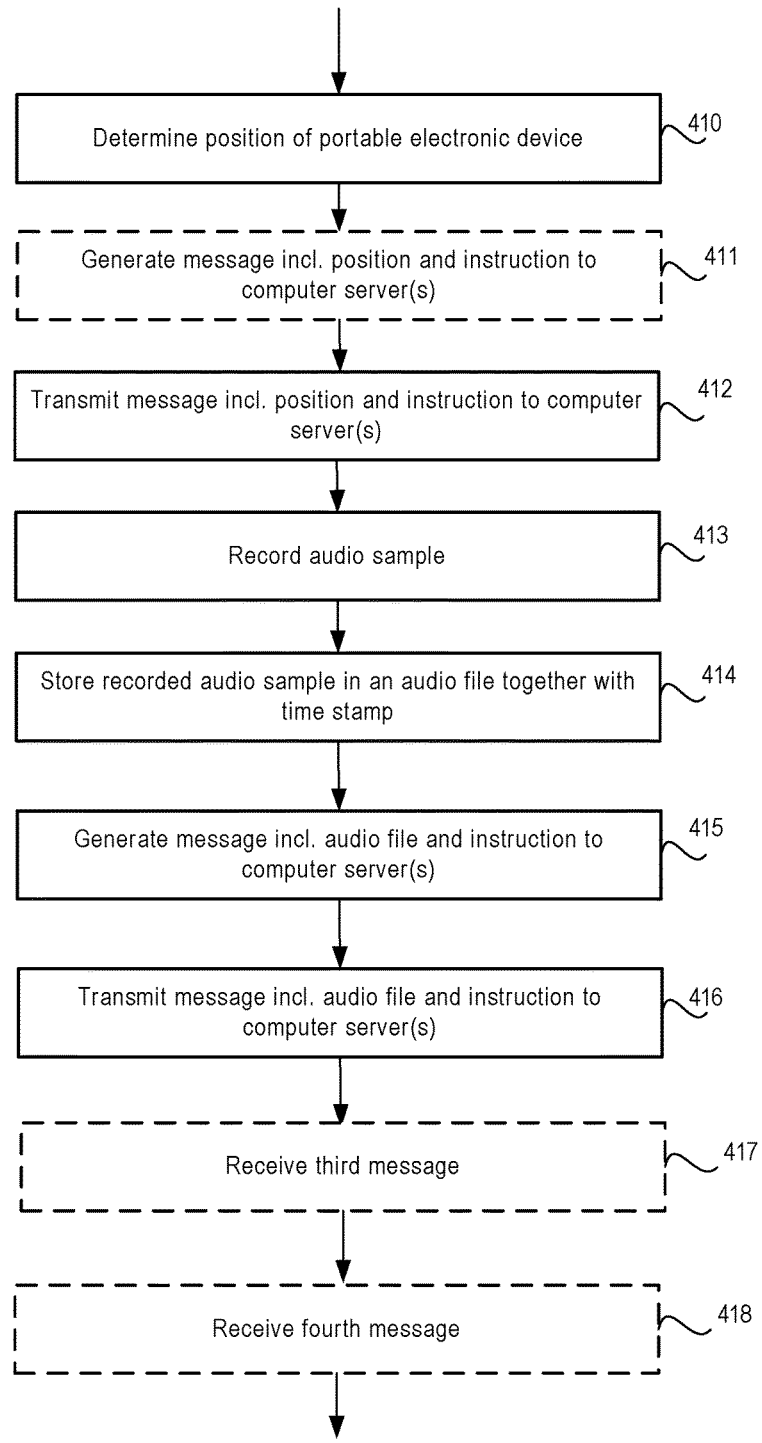
FIG. 4A schematically illustrates a flowchart of a method performed by a portable electronic device in accordance with another embodiment.
Figure 4B:
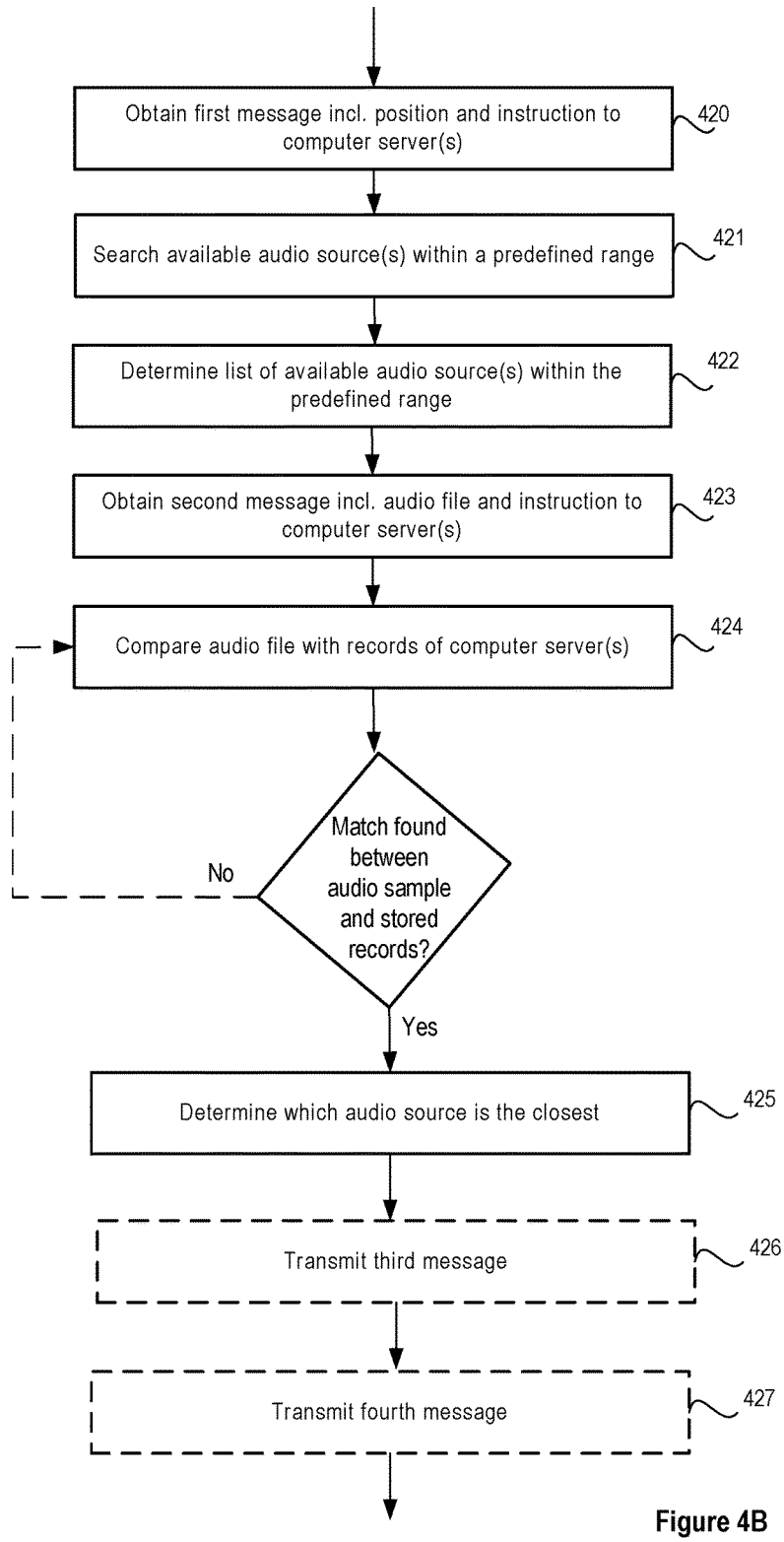
FIG. 4B schematically illustrates a flowchart of a method performed by a computer server in accordance with another embodiment.

Reference is now made to FIGS. 4A and 4B, which relate to methods for identifying an audio source outputting audio in accordance with some embodiments.

FIG. 4A is a flowchart of a method performed by, or otherwise executed in, a portable electronic device 200. The actions, or method steps, of this method will now be described in more detail.

Action 410: Position coordinates of the portable electronic device are determined, or otherwise calculated. For example, the position coordinates may be determined by means of a location-detection device of the portable electronic device. In some embodiments, the location-detection device comprises a GNSS device. A GNSS device is adapted to determine position coordinates of the portable electronic device utilizing the GNSS system. As described earlier herein in connection with the embodiment of FIG. 3A, other geo-location techniques may additionally, or alternatively, be utilized for determining the location, or position, of the portable electronic device.

Action 411: A first data message may be may be created, or otherwise produced. The first data message may include the position coordinates that were determined in action 410. The first data message may also include an instruction, or request, to a computer server to search for available audio sources within a predefined range of said position coordinates. This instruction may be an explicit instruction, which is included or otherwise incorporated into the first data message. Alternatively, the instruction may be an implicit instruction. That is, upon receipt by the computer server the computer server would recognize the first data message to represent an instruction, or request, to the computer server to search for available audio sources within a predefined range of the determined position coordinates position coordinates without any explicit instruction being included as such in the first data message. In some embodiments, separate data messages are created for the position coordinates and the instruction.

Action 412: The position coordinates and the instruction to search for available audio sources within the predefined range of said position coordinates are sent, i.e. transmitted, to a computer server. In some embodiments, sending the position coordinates and the instruction comprises sending the first data message to the computer server.

Action 413: Audio is sampled. The audio is typically sampled during a predetermined sampling time period. Hence, an audio sample may be generated or otherwise created. For example, the audio may be sampled by means of an audio-recording device, or audio recorder. In other words, the audio-recording device is adapted to record audio to produce the audio sample. In some embodiments, the audio recording device comprises a microphone.

Action 414: The sampled audio, i.e. the audio sample recorded in action 413, can be stored by means of a storage device, e.g. a memory. The sampled audio does not have to be permanently stored. Instead, it may suffice that the sampled audio is temporarily stored. More particularly, the audio sample may be stored in an audio file together with a time stamp indicative of the earlier-mentioned predetermined sampling time period (e.g., specifying a beginning and or end of the sampling time period).

Action 415: A second data message may be created, or otherwise produced. The second data message comprises (e.g., stores) the earlier-mentioned audio file and an instruction, or request, to a computer server to compare the sampled audio included in the audio file with audio outputted by any one of the audio sources found by the computer server to be within a predefined range of said position coordinates to see if a match can be found. This instruction may be an explicit instruction, which is included or otherwise incorporated into the second data message. Alternatively, the instruction may be an implicit instruction. That is, upon receipt by the computer server the computer server would recognize the second data message to represent an instruction, or request, to compare the sampled audio included in the audio file with audio outputted by any one of the audio sources found by the computer server to be within a predefined range of said position coordinates to see if a match can be found. In some embodiments, the audio file is included in one or more data messages and the instruction to compare the audio is included in another data message.

Action 416: The audio file and the instruction to compare the audio are sent, i.e. transmitted, to the computer server. In some embodiments, sending the audio file and the instruction to compare comprises sending the second data message.

Reference is now made to FIG. 4B, which schematically illustrates a flowchart of a method performed by, or otherwise executed in, a computer server. The actions, or method steps, of this method will now be described in more detail. As will be appreciated, the method may be performed by one single computer server. Alternatively, however, the method may be performed by several computer servers in a distributed manner. If the method is performed by, or otherwise executed in, several computer servers, the different involved computer servers may perform different actions, or method steps, such that the method can be completed by the involved computer servers.

Action 420: A first data message is obtained. For example, the first data message may be received from a portable electronic device. As described earlier, the first data message may include position coordinates related to a position of the portable electronic device and an instruction to the computer server to search for available audio sources within a predefined range of said position coordinates. Again, this instruction may either be an explicit instruction or an implicit instruction. Alternatively, the position coordinates and the instruction are obtained in separate data messages.

Action 421: In response to receiving the position coordinates and the instruction, available audio source(s) within the predefined range, or distance, from the location indicated by said position coordinates are searched. To this end, the received position coordinates are utilized.

Action 422: A list of available audio source(s) within the predefined range of the receive position coordinates is determined, or otherwise produced. The list of available audio source(s) may comprise none, one or several available audio source(s) depending on the outcome from the search in action 421.

Action 423: A second data message may also be obtained. For example, the second data message may be received from the portable electronic device. The second data message typically comprises (e.g., stores) an audio file including sampled audio, i.e. an audio sample. Also, a time stamp indicative of a predetermined sampling time period during which audio has been sampled is included in the second data message. Furthermore, the second data message includes an instruction to said computer server to compare the sampled audio included in the audio file with audio presented by any one of the audio sources of the determined list of available audio sources. This instruction may either be an explicit instruction or an implicit instruction. In some embodiments, the audio file is obtained in one or more data messages and the instruction to compare the audio is obtained in a separate data message.

Action 424: In response to obtaining (e.g., receiving) the second data message, the sampled audio (i.e., the audio sample) of the received audio file is compared with audio outputted by any one of the audio sources of the determined list of available audio sources during a period of time that matches said time stamp.

As will be appreciated, the computer server may thus comprise a storage device (e.g., a memory) including a database. The database may, for example, include a library of audio sources including none, one or several audio source(s) currently outputting audio, e.g. playing music. Each one of the audio source(s) in said library of audio source(s) may be indexed with a value indicative of its respective location (i.e., position). Furthermore, the database may include a library of audio items, e.g. music. Thus, the database may comprise (e.g., store) a large plurality of audio items. As will be appreciated, the computer server is thus operable to have knowledge of which audio item(s) is/are being played and/or has/have been played and by which audio source(s). Or said differently, each one of the audio source(s) in said library of audio source(s) can be accompanied with information related to:

which audio item(s) is/are being played by an audio source in question;

which audio item(s) has/have been played by an audio source in question; and/or which audio item(s) is/are queued to played next by an audio source in question.

Action 425: In response to finding a match between the sampled audio (i.e., the audio sample) of the received audio file with audio outputted by any one of the audio sources of the determined list of available audio sources during said period of time that matches said time stamp (i.e., 'YES' in FIG. 4B), a corresponding audio source is identified. In some embodiments, identifying the corresponding audio source comprises determining which audio source of the audio sources of the determined list of available audio sources is closest to the portable electronic device (or, represents the audio source which is closest to the portable electronic device).

By combining location and audio recognition it is made possible to identify an audio source currently outputting audio (e.g., playing music) with a relatively good precision. At the same time, the task of identifying the audio source is relatively quick. This may be important for the overall user experience, e.g., in a use case scenario where a user wishes to identify a social gathering (e.g., party) nearby.

Action 426: A third data message may optionally be returned, i.e. sent, to the portable electronic device. The third data message may comprise information related to (e.g., specifying) which audio source outputting audio is closest to the portable electronic device.

Action 427: A fourth data message may optionally be returned, i.e. sent, to the portable electronic device. The fourth data message may include a list of available audio sources outputting audio and within a predefined range of said position coordinates.

As will be appreciated, in some embodiments, the third and fourth data messages may optionally be combined into one single data message.

Turning now back to FIG. 4A, it will be appreciated that the third and/or fourth data message(s) may be obtained (e.g., received) by the portable electronic device. This is schematically illustrated in actions, or method steps, 417 and 418, respectively.

Figure 5:
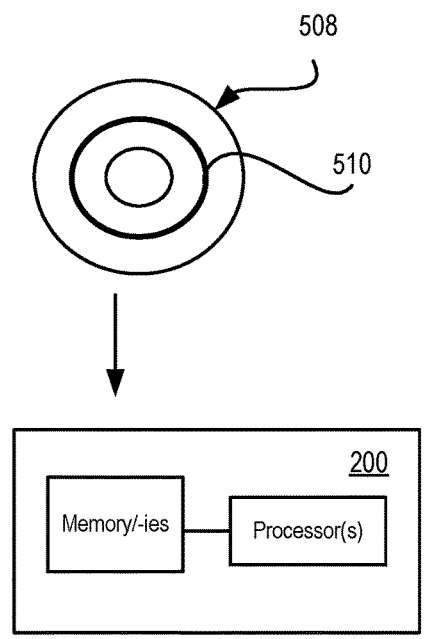
FIG. 5 illustrates a carrier comprising (e.g., storing) a computer program, in accordance with an embodiment.

Turning now to FIG. 5, another embodiment will be briefly discussed. FIG. 5 shows an example of a computer-readable medium, in this example in the form of a data disc 508. In one embodiment the data disc 508 is a magnetic data storage disc. The data disc 508 is configured to carry instructions 510 that can be loaded into a memory of an apparatus, e.g. a portable electronic device 200. Upon execution of said instructions by at least one processor of the apparatus, the apparatus is caused to execute a method or procedure according to any one or both of the embodiments described herein in conjunction with FIGS. 3A and 4A. The data disc 508 is arranged to be connected to or within and read by a reading device (not shown), for loading the instructions into the at least one processor. One such example of a reading device in combination with one (or several) data disc(s) 508 is a hard drive. It should be noted that the computer-readable medium can also be other mediums such as compact discs, flash memories or other memory technologies commonly used. In such an embodiment the data disc 508 is one type of a tangible, non-transitory computer-readable medium. The instructions may alternatively be downloaded to a computer data reading device, such as an apparatus 200 capable of reading computer coded data on a computer-readable medium, by comprising (e.g., storing) the instructions in a computer-readable signal (not shown) which is transmitted via a wireless (or wired)

interface (for example via the Internet) to the computer data reading device for loading the instructions into at least one processor of the apparatus 200. In such an embodiment, the computer-readable signal is one type of a non-tangible computer-readable medium.

Figure 6:
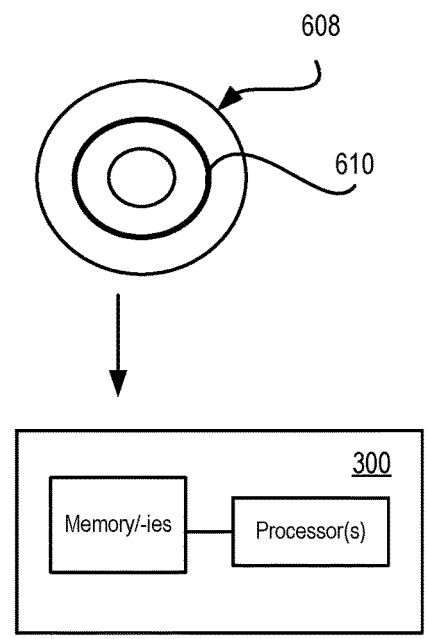
FIG. 6 illustrates a carrier comprising (e.g., storing) a computer program, in accordance with an embodiment.

Reference is now made to FIG. 6, which shows another embodiment. FIG. 6 shows an example of a computer-readable medium, in this example in the form of a data disc 608. In one embodiment the data disc 608 is a magnetic data storage disc. The data disc 608 is configured to carry instructions 610 that can be loaded into a memory of an apparatus, e.g. computer server 300. Upon execution of said instructions by at least one processor of the apparatus, the apparatus is caused to execute a method or procedure according to any one or both of the embodiments described herein in conjunction with FIGS. 3B and 4B. The data disc 608 is arranged to be connected to or within and read by a reading device (not shown), for loading the instructions into the at least one processor. One such example of a reading device in combination with one (or several) data disc(s) 608 is a hard drive. It should be noted that the computer-readable medium can also be other mediums such as compact discs, flash memories or other memory technologies commonly used. In such an embodiment the data disc 608 is one type of a tangible, non-transitory computer-readable medium. The instructions may alternatively be downloaded to a computer data reading device, such as an apparatus 300 capable of reading computer coded data on a computer-readable medium, by comprising (e.g., storing) the instructions in a computer-readable signal (not shown) which is transmitted via a wireless (or wired) interface (for example via the Internet) to the computer data reading device for loading the instructions into at least one processor of the apparatus 300. In such an embodiment, the computer-readable signal is one type of a non-tangible computer-readable medium.

Figure 7:
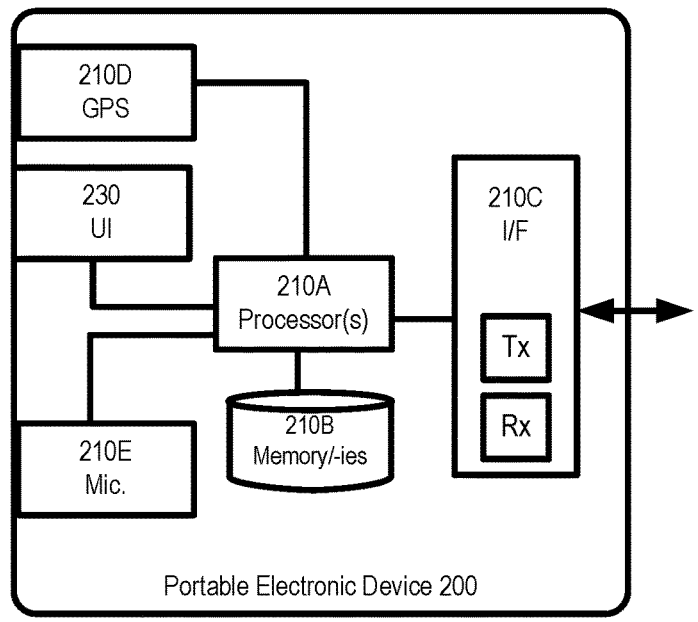
FIG. 7 schematically illustrates an example implementation of an embodiment of a portable electronic device.

Reference is now made to FIG. 7 which schematically illustrates an example implementation of an embodiment of a portable electronic device 200. The portable electronic device 200 may be configured to perform, or otherwise execute, the method in accordance with the embodiment described herein in conjunction with FIG. 3A. To this end, the portable electronic device 200 may comprise a user interface 230. The portable electronic device 200 also comprises hardware resources 210 (see also FIG. 2). For example, the portable electronic device 200 may comprise one or more processors 210A and one or more storage devices (e.g. memories) 210B. Also, a communications interface 210C, or a communications circuitry, may be provided in order to allow the portable electronic device 200 to communicate with the other portable electronic devices 200 and/or servers 300 and/or media presentation systems 500, e.g. via a network 400 such as the Internet (see FIG. 1). To this end, the communications interface 210C may comprise a transmitter (Tx) and a receiver (Rx). Alternatively, the communications interface 210C may comprise a transceiver (Tx/Rx) combining both transmission and reception capabilities. The communications interface 210C may include a radio frequency (RF) interface allowing the portable electronic device 200 to communicate with the portable electronic device 200 and/or servers 300 and/or media presentation systems 500 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera. As can be seen in FIG. 2, the second electronic device 200 may also comprise (e.g., store) one or more applications, e.g. the media playback software application 220. The applications are sets of instructions (e.g., computer program code) that when executed by the one or more processors 210A controls the operation of the portable electronic device 200.

Furthermore, the portable electronic device 200 may comprise a location-detection device, here exemplified by a GNSS device (e.g., a GPS unit) 210D. Also, the portable electronic device 200 comprises an audio-recording device, here exemplified by a microphone 210E.

In some implementations, the storage device 210B comprises (i.e., stores) instructions executable by the one or more processors 210A whereby the portable electronic device 200 is operative to determine (e.g., by means of the location-detection device 210D) position coordinates of the portable electronic device; sample audio, by means of the audio-recording device 210E, generate an audio sample; convert the audio sample into a fingerprint; and send (i.e., transmit), by means of the transmitter (Tx) 210C, (e.g., in a first data message) to a computer server said position coordinates as well as the fingerprint. In some embodiments, said first data message constitutes an instruction to the computer server to search for available audio sources on the basis of said position coordinates as well as said fingerprint.

In some implementations, the portable electronic device 200 further comprises a receiver (Rx) 210C adapted to receive a second data message from the computer server in response to the computer server finding a match based on the position coordinates as well as the fingerprint, said second data message comprising information related to (e.g., specifying) which audio source outputting audio is closest to the portable electronic device (or represents the audio source outputting audio is closest to the portable electronic device).

Figure 8:
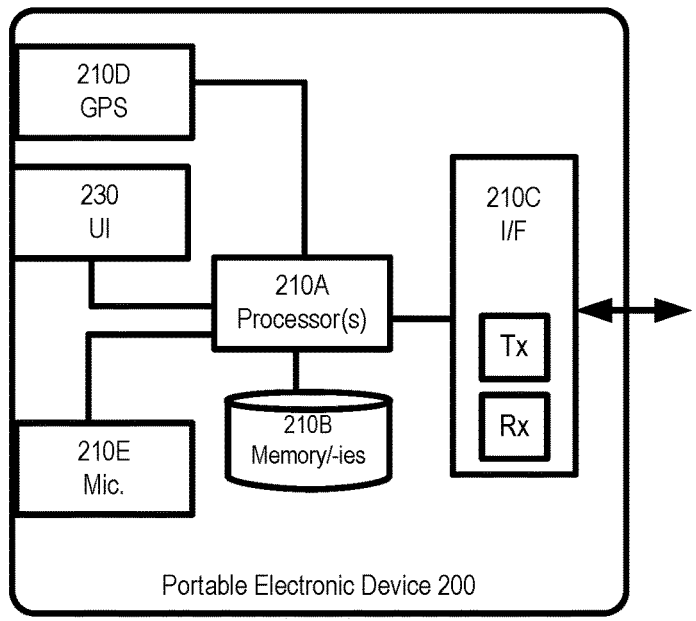
FIG. 8 schematically illustrates an example implementation of an embodiment of a portable electronic device.

Reference is now made to FIG. 8 which schematically illustrates an example implementation of another embodiment of a portable electronic device 200. The portable electronic device 200 may be configured to perform, or otherwise execute, the method in accordance with the embodiment described herein in conjunction with FIG. 4A. To this end, the portable electronic device 200 may comprise a user interface 230. The portable electronic device 200 also comprises hardware resources 210 (see also FIG. 2). For example, the portable electronic device 200 may comprise one or more processors 210A and one or more storage devices (e.g. memories) 210B. Also, a communications interface 210C, or a communications circuitry, may be provided in order to allow the portable electronic device 200 to communicate with the other portable electronic devices 200 and/or servers 300 and/or media presentation systems 500, e.g. via a network 400 such as the Internet (see FIG. 1). To this end, the communications interface 210C may comprise a transmitter (Tx) and a receiver (Rx). Alternatively, the communications interface 210C may comprise a transceiver (Tx/Rx) combining both transmission and reception capabilities. The communications interface 210C may include a radio frequency (RF) interface allowing the portable electronic device 200 to communicate with the portable electronic device 200 and/or servers 300 and/or media presentation systems 500 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera. As can be seen in FIG. 2, the second electronic device 200 may also comprise (e.g., store) one or more applications, e.g. the media playback software application 220. The applications are sets of instructions (e.g., computer program code) that when executed by the one or more processors 210A controls the operation of the portable electronic device 200.

Furthermore, the portable electronic device 200 may comprise a location-detection device, here exemplified by a GNSS device (e.g., GPS unit) 210D. Also, the portable electronic device 200 comprises an audio-recording device, here exemplified by a microphone 210E.

In some implementations, the storage device 210B comprises (i.e., stores) instructions executable by the one or more processors 210A to cause the portable electronic device 200 to determine (e.g., by means of the location-detection device) position coordinates of the portable electronic device; send, by means of the transmitter (Tx) 210C, (e.g., in a first data message) to a computer server said position coordinates and an instruction to the computer server to search for available audio sources within a predefined range of said position coordinates; sample audio, by means of the audio-recording device, during a predetermined sampling time period; store, by means of another storage device (not shown) or the same storage device 210B, the sampled audio in an audio file together with a time stamp indicative of said predetermined sampling time period; send, by means of the transmitter (Tx) 210C, (e.g., in a second data message) to the computer server said audio file and an instruction to said computer server to compare the sampled audio included in the audio file with audio outputted by any one of the audio sources found by the computer server to be within a predefined range of said position coordinates to see if a match can be found.

In some implementations, a receiver (Rx) 201C is provided to receive a third data message from the computer server in response to the computer server finding a match, said third data message comprising information related to (e.g., specifying) which audio source outputting audio is closest to the portable electronic device.

In some implementations, the receiver (Rx) is additionally, or alternatively, adapted to receive a fourth data message from the computer server, said fourth data message including a list of available audio sources outputting audio and within a predefined range of said position coordinates.

Figure 9:
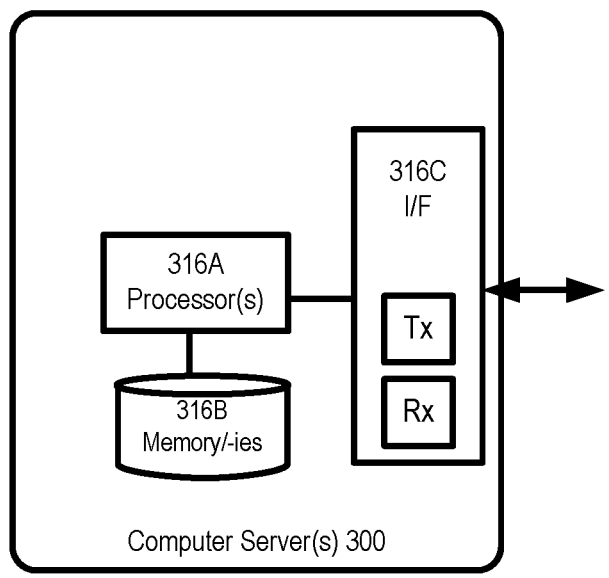
FIG. 9 schematically illustrates an example implementation of an embodiment of a computer server.

Reference is now made to FIG. 9, which schematically illustrates an example implementation of an embodiment of a computer server 300. The computer server 300 may be configured to perform, or otherwise execute, the method in accordance with the embodiment described herein in conjunction with FIG. 3B. To this end, the computer server 300 comprises hardware resources 316 (see also FIG. 2). For example, the computer server 300 may comprise one or more processors 316A and one or more storage devices (e.g. memories) 316B. Also, a communications interface 316C, or a communications circuitry, may be provided in order to allow the computer server 300 to communicate with the other computer servers 300 and/or portable electronic devices 200 and/or media presentation systems 500, e.g. via a network 400 such as the Internet (see FIG. 1). To this end, the communications interface 316C may comprise a transmitter (Tx) and a receiver (Rx). Alternatively, the communications interface 316C may comprise a transceiver (Tx/Rx) combining both transmission and reception capabilities. The communications interface 316C may include a radio frequency (RF) interface allowing the computer server 300 to communicate with the portable electronic device 200 and/or computer servers 300 and/or media presentation systems 500 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera. As can be seen in FIG. 2, the computer server 300 may also comprise (e.g., store) one or more applications, e.g. a media stream service application 320. The applications are sets of instructions (e.g., computer program code) that when executed by the one or more processors 316A controls the operation of the computer server 300.

In some implementations, the storage device 316B comprises (i.e., stores) instructions executable by the one or more processors 316A to cause the computer server 300 to receive, by means of the receiver (Rx) 316C, (e.g., in a first data message) from a portable electronic device position coordinates related to a position of the portable electronic device as well as a fingerprint representing an audio sample; search for available audio sources within the predefined range of said position coordinates by utilizing the received position coordinates; determine a list of available audio sources within a predefined range of said position coordinates; compare the received fingerprint with fingerprints of corresponding audio samples of the determined list of available audio sources; and in response to finding a match between the received fingerprint and any one of the fingerprints of corresponding audio samples of the determined list of available audio sources, identify a corresponding audio source. In some embodiments, identifying the corresponding audio source comprises determining which audio source of the audio sources of the determined list of available audio sources is closest to the portable electronic device.

In some implementations, a transmitter (Tx) 316C is also provided to transmit a second data message from the computer server in response to the computer server finding a match, said second data message comprising information related to (e.g., specifying) which audio source outputting audio is closest to the portable electronic device.

Figure 10:
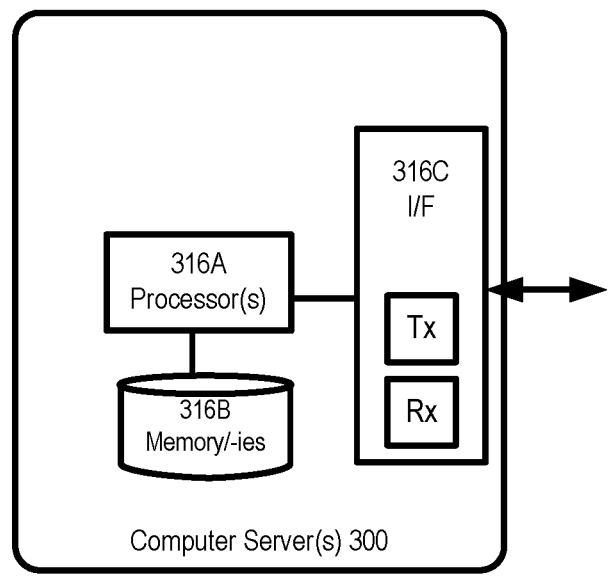
FIG. 10 schematically illustrates an example implementation of an embodiment of a computer server.

Reference is now made to FIG. 10, which schematically illustrates an example implementation of an embodiment of a computer server 300. The computer server 300 may be configured to perform, or otherwise execute, the method in accordance with the embodiment described herein in conjunction with FIG. 4B. To this end, the computer server 300 comprises hardware resources 316 (see also FIG. 2). For example, the computer server 300 may comprise one or more processors 316A and one or more storage devices (e.g. memories) 316B. Also, a communications interface 316C, or a communications circuitry, may be provided in order to allow the computer server 300 to communicate with the other computer servers 300 and/or portable electronic devices 200 and/or media presentation systems 500, e.g. via a network 400 such as the Internet (see FIG. 1). To this end, the communications interface 316C may comprise a transmitter (Tx) and a receiver (Rx). Alternatively, the communications interface 316C may comprise a transceiver (Tx/Rx) combining both transmission and reception capabilities. The communications interface 316C may include a radio frequency (RF) interface allowing the computer server 300 to communicate with the portable electronic device 200 and/or computer servers 300 and/or media presentation systems 500 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etc. As can be seen in FIG. 2, the computer server 300 may also comprise (e.g., store) one or more applications, e.g. a media stream service application 320. The applications are sets of instructions (e.g., computer program code) that when executed by the one or more processors 316A controls the operation of the computer server 300.

In some implementations, the storage device 316B comprises (i.e., stores) instructions executable by the one or more processors 316A to cause the computer server 300 to receive, by means of the receiver (Rx) 316C, (e.g., in a first data message) from a portable electronic device position coordinates related to a position of the portable electronic device and an instruction to the computer server to search for available audio sources within a predefined range of said position coordinates; search for available audio sources within the predefined range of said position coordinates by utilizing the received position coordinates; determine a list of available audio sources within a predefined range of said position coordinates; receive, by means of the receiver (Rx) 316C, (e.g., in a second data message) from the portable electronic device: i) an audio file including sampled audio and a time stamp indicative of a predetermined sampling time period during which audio has been sampled; and ii) an instruction to said computer server to compare the sampled audio included in the audio file with audio presented by any one of the audio sources of the determined list of available audio sources; in response thereto, compare the sampled audio of the received audio file with audio outputted by any one of the audio sources of the determined list of available audio sources during a period of time that matches said time stamp; and in response to finding a match between the sampled audio of the received audio file with audio outputted by any one of the audio sources of the determined list of available audio sources during said period of time that matches said time stamp, identify a corresponding audio source. In some embodiments, identifying the corresponding audio source comprises determining which audio source of the audio sources of the determined list of available audio sources is closest to the portable electronic device.

In some implementations, a transmitter (Tx) 316C may be provided to send a third data message to the portable electronic device, said third data message comprising information related to (e.g., specifying) which audio source outputting audio is closest to the portable electronic device.

In some implementations, the transmitter (Tx) 316C is additionally, or alternatively, adapted to send a fourth data message to the portable electronic device, said fourth data message including a list of available audio sources outputting audio and within a predefined range of said position coordinates.

Various embodiments related to identifying an audio source that is currently outputting audio (e.g., playing music) have been described. By combining audio fingerprinting or audio recognition together with positioning, it is made possible to identify, or otherwise find, an audio source that is currently outputting audio. The various embodiments are advantageous in that they allow for identifying an audio source that is currently outputting audio without unnecessary complexity. In an example use case scenario, this may for instance assist a user to identify a certain social gathering such as a party relatively easy and quickly. This is believed to become an advantageous feature in today's and in future media streaming services.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or at least one processor, whether or not such computer or at least one processor is explicitly shown. The functions of the various elements, including functional blocks, may be provided through the use of hardware such as circuit hardware and/or hardware capable of executing software in the form of coded instructions stored on the above-mentioned computer readable medium. Thus, such functions and illustrated functional blocks are to be understood as being hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or at least one processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Numbered Example Embodiments (NEE's)

In view of the embodiments described hitherto, the technology disclosed herein thus encompasses the following non-limiting numbered example embodiments:

NEE1. A method performed by a portable electronic device for identifying an audio source that is outputting audio, the method comprising:

determining, by means of a location-detection device, position coordinates of the portable electronic device;

sending a first data message to a computer server, said first data message including said position coordinates and an instruction to the computer server to search for available audio sources within a predefined range of said position coordinates;

sampling audio, by means of an audio-recording device, during a predetermined sampling time period;

storing, by means of a storage device, the sampled audio in an audio file together with a time stamp indicative of said predetermined sampling time period;

sending a second data message to the computer server, said second data message including said audio file and an instruction to said computer server to compare the sampled audio included in the audio file with audio outputted by any one of the audio sources found by the computer server to be within a predefined range of said position coordinates to see if a match can be found.

NEE2. The method according to NEE1, further comprising:

receiving a third data message from the computer server in response to the computer server finding a match, said third data message comprising information related to which audio source outputting audio is closest to the portable electronic device.

NEE3. The method according to NEE1, further comprising:

receiving a fourth data message from the computer server, said fourth data message including a list of available audio sources outputting audio and within the predefined range of said position coordinates.

NEE4. The method according to NEE2, further comprising:

receiving a fourth data message from the computer server, said fourth data message including a list of available audio sources which is/are outputting audio and which is/are within the predefined range of said position coordinates.

NEE5. A method performed by a computer server for identifying an audio source that is outputting audio, the method comprising:

receiving a first data message from a portable electronic device, said first data message including position coordinates related to a position of the portable electronic device and an instruction to the computer server to search for available audio sources within a predefined range of said position coordinates;

searching for available audio sources within the predefined range of said position coordinates by utilizing the received position coordinates;

determining a list of available audio sources within a predefined range of said position coordinates; the method further comprising:

receiving a second data message from the portable electronic device, said second data message including:

an audio file including sampled audio and a time stamp indicative of a predetermined sampling time period during which audio has been sampled; and an instruction to said computer server to compare the sampled audio included in the audio file with audio presented by any one of the audio sources of the determined list of available audio sources;

in response to the second data message, comparing the sampled audio of the received audio file with audio outputted by any one of the audio sources of the determined list of available audio sources during a period of time that matches said time stamp; and in response to finding a match between the sampled audio of the received audio file with audio outputted by any one of the audio sources of the determined list of available audio sources during said period of time that matches said time stamp, determining which audio source of the audio sources of the determined list of available audio sources that is closest to the portable electronic device.

NEE6. The method according to NEE5, further comprising:

sending a third data message to the portable electronic device, said third data message comprising information related to which audio source outputting audio is closest to the portable electronic device.

NEE7. The method according to NEE5, further comprising:

sending a fourth data message to the portable electronic device, said fourth data message including a list of available audio sources which is/are outputting audio and which is/are within a predefined range of said position coordinates.

NEE8. The method according to NEE6, further comprising:

sending a fourth data message to the portable electronic device, said fourth data message including a list of available audio sources outputting audio and within a predefined range of said position coordinates.

NEE9. A portable electronic device, comprising:

a location-detection device;

an audio-recording device;

a transmitter;

at least one processor; and a storage device comprising instructions executable by the at least one processor whereby the portable electronic device is operative to:

determine, by means of the location-detection device, position coordinates of the portable electronic device;

send, by means of the transmitter, a first data message to a computer server, said first data message including said position coordinates and an instruction to the computer server to search for available audio sources within a predefined range of said position coordinates;

sample audio, by means of the audio-recording device, during a predetermined sampling time period;

store, by means of another storage device, the sampled audio in an audio file together with a time stamp indicative of said predetermined sampling time period;

send, by means of the transmitter, a second data message to the computer server, said second data message including said audio file and an instruction to said computer server to compare the sampled audio included in the audio file with audio outputted by any one of the audio sources found by the computer server to be within a predefined range of said position coordinates to see if a match can be found.

NEE10. The portable electronic device according to NEE9, further comprising:

a receiver adapted to receive a third data message from the computer server in response to the computer server finding a match, said third data message comprising information related to which audio source outputting audio is closest to the portable electronic device.

NEE11. The portable electronic device according to NEE9, further comprising:

a receiver adapted to receive a fourth data message from the computer server, said fourth data message including a list of available audio sources outputting audio and within a predefined range of said position coordinates.

NEE12. The portable electronic device according to NEE10, wherein the receiver is further adapted to receive a fourth data message from the computer server, said fourth data message including a list of available audio sources which is/are outputting audio and which is/are within a predefined range of said position coordinates.

NEE13. A computer server, comprising:
a receiver;
at least one processor; and
a storage device comprising instructions executable by the at least one processor whereby the computer server is operative to:
 receive, by means of the receiver, a first data message from a portable electronic device, said first data message including position coordinates related to a position of the portable electronic device and an instruction to the computer server to search for available audio sources within a predefined range of said position coordinates;
 search for available audio sources within a predefined range of said position coordinates by utilizing the received position coordinates;
 determine a list of available audio sources within the predefined range of said position coordinates;
 receive, by means of the receiver, a second data message from the portable electronic device, said second data message including:
  an audio file including sampled audio and a time stamp indicative of a predetermined sampling time period during which audio has been sampled; and
  an instruction to said computer server to compare the sampled audio included in the audio file with audio presented by any one of the audio sources of the determined list of available audio sources;
 in response to the second data message, compare the sampled audio of the received audio file with audio outputted by any one of the audio sources of the determined list of available audio sources during a period of time that matches said time stamp; and
 in response to finding a match between the sampled audio of the received audio file with audio outputted by any one of the audio sources of the determined list of available audio sources during said period of time that matches said time stamp, determine which audio source of the audio sources of the determined list of available audio sources that is closest to the portable electronic device.

NEE14. The computer server according to NEE13, further comprising:
a transmitter adapted to send a third data message to the portable electronic device, said third data message comprising information related to which audio source outputting audio is closest to the portable electronic device.

NEE15. The computer server according to NEE13, further comprising:
a transmitter adapted to send a fourth data message to the portable electronic device, said fourth data message including a list of available audio sources outputting audio and within a predefined range of said position coordinates.

NEE16. The computer server according to NEE14, wherein the transmitter is further adapted to send a fourth data message to the portable electronic device, said fourth data message including a list of available audio sources which is/are outputting audio and which is/are within a predefined range of said position coordinates.

NEE17. A non-transitory computer readable storage medium storing one or more sets of instructions for causing at least one processor to:
 determine, by means of a location-detection device, position coordinates of the portable electronic device;
 send, by means of a transmitter, a first data message to a computer server, said first data message including said position coordinates and an instruction to the computer server to search for available audio sources within a predefined range of said position coordinates;
 sample audio, by means of an audio-recording device, during a predetermined sampling time period;
 store, by means of a storage device, the sampled audio in an audio file together with a time stamp indicative of said predetermined sampling time period;
 send, by means of the transmitter, a second data message to the computer server, said second data message including said audio file and an instruction to said computer server to compare the sampled audio included in the audio file with audio outputted by any one of the audio sources found by the computer server to be within the predefined range of said position coordinates to see if a match can be found.

NEE18. A non-transitory computer readable storage medium storing one or more sets of instructions for causing at least one processor to:
 receive, by means of a receiver, a first data message from a portable electronic device, said first data message including position coordinates related to a position of the portable electronic device and an instruction to the computer server to search for available audio sources within a predefined range of said position coordinates;
 search for available audio sources within a predefined range of said position coordinates by utilizing the received position coordinates;
 determine a list of available audio sources within the predefined range of said position coordinates;
 receive, by means of the receiver, a second data message from the portable electronic device, said second data message including:
  an audio file including sampled audio and a time stamp indicative of a predetermined sampling time period during which audio has been sampled; and
  an instruction to said computer server to compare the sampled audio included in the audio file with audio presented by any one of the audio sources of the determined list of available audio sources;
 in response to the second data message, compare the sampled audio of the received audio file with audio outputted by any one of the audio sources of the determined list of available audio sources during a period of time that matches said time stamp; and in response to finding a match between the sampled audio of the received audio file with audio outputted by any one of the audio sources of the determined list of available audio sources during said period of time that matches said time stamp, determine which audio source of the audio sources of the determined list of available audio sources that is closest to the portable electronic device.

NEE19. A method performed by a portable electronic device for identifying an audio source that is outputting audio, the method comprising:
 determining, by means of a location-detection device, position coordinates of the portable electronic device;
 sampling audio, by means of an audio-recording device, to generate an audio sample;
 converting the audio sample into a fingerprint; and
 sending a first data message to a computer server, said first data message including said position coordinates as well as the fingerprint, wherein said first data message constitutes an instruction to the computer server to search for available audio sources on the basis of said position coordinates as well as said fingerprint.

NEE20. The method according to NEE19, further comprising:
 receiving a second data message from the computer server in response to the computer server finding a match based on the position coordinates as well as the fingerprint, said second data message comprising information related to which audio source outputting audio is closest to the portable electronic device.

NEE21. A method performed by a computer server for identifying an audio source that is outputting audio, the method comprising:
  receiving a first data message from a portable electronic device, said first data message including position coordinates related to a position of the portable electronic device as well as a fingerprint representing an audio sample;
  searching for available audio sources within a predefined range of said position coordinates by utilizing the received position coordinates;
  determining a list of available audio sources within the predefined range of said position coordinates;
  comparing the received fingerprint with fingerprints of corresponding audio samples of the determined list of available audio sources; and
  in response to finding a match between the received fingerprint and any one of the fingerprints of corresponding audio samples of the determined list of available audio sources, determining which audio source of the audio sources of the determined list of available audio sources that is closest to the portable electronic device.

NEE22. The method according to NEE21, further comprising:
  sending a second data message from the computer server in response to the computer server finding a match, said second data message comprising information related to which audio source outputting audio is closest to the portable electronic device.

NEE23. A portable electronic device comprising:
  a location-detection device;
  an audio-recording device;
  a transmitter;
  at least one processor; and
  a storage device comprising instructions executable by the at least one processor whereby the portable electronic device is operative to:
    determine, by means of the location-detection device, position coordinates of the portable electronic device;
    sample audio, by means of the audio-recording device, to generate an audio sample;
    convert the audio sample into a fingerprint; and
    send, by means of the transmitter, a first data message to a computer server, said first data message including said position coordinates as well as the fingerprint, wherein said first data message constitutes an instruction to the computer server to search for available audio sources on the basis of said position coordinates as well as said fingerprint.

NEE24. The portable electronic device according to NEE23, further comprising:
  a receiver adapted to receive a second data message from the computer server in response to the computer server finding a match based on the position coordinates as well as the fingerprint, said second data message comprising information related to which audio source outputting audio is closest to the portable electronic device.

NEE25. A computer server, comprising:
  a receiver;
  at least one processor; and
  a storage device comprising instructions executable by the at least one processor whereby the computer server is operative to:
    receive, by means of the receiver, a first data message from a portable electronic device, said first data message including position coordinates related to a position of the portable electronic device as well as a fingerprint representing an audio sample;
    search for available audio sources within a predefined range of said position coordinates by utilizing the received position coordinates;
    determine a list of available audio sources within the predefined range of said position coordinates;
    compare the received fingerprint with fingerprints of corresponding audio samples of the determined list of available audio sources; and
    in response to finding a match between the received fingerprint and any one of the fingerprints of corresponding audio samples of the determined list of available audio sources, determine which audio source of the audio sources of the determined list of available audio sources that is closest to the portable electronic device.

NEE26. The computer server according to NEE25, further comprising:
  a transmitter adapted to send a second data message from the computer server in response to the computer server finding a match, said second data message comprising information related to which audio source outputting audio is closest to the portable electronic device.

NEE27. A non-transitory computer readable storage medium storing one or more sets of instructions for causing at least one processor to:
  determine, by means of a location-detection device, position coordinates of the portable electronic device;
  sample audio, by means of an audio-recording device, to generate an audio sample;
  convert the audio sample into a fingerprint; and
  send, by means of a transmitter, a first data message to a computer server, said first data message including said position coordinates as well as the fingerprint, wherein said first data message constitutes an instruction to the computer server to search for available audio sources on the basis of said position coordinates as well as said fingerprint.

NEE28. A non-transitory computer readable storage medium storing one or more sets of instructions for causing at least one processor to:
  receive, by means of a receiver, a first data message from a portable electronic device, said first data message including position coordinates related to a position of the portable electronic device as well as a fingerprint representing an audio sample;
  search for available audio sources within a predefined range of said position coordinates by utilizing the received position coordinates;
  determine a list of available audio sources within the predefined range of said position coordinates;
  compare the received fingerprint with fingerprints of corresponding audio samples of the determined list of available audio sources; and
  in response to finding a match between the received fingerprint and any one of the fingerprints of corresponding audio samples of the determined list of available audio sources, determine which audio source of the audio sources of the determined list of available audio sources that is closest to the portable electronic device.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

What is claimed is:

1. A method performed by a computer server of a media streaming service for identifying an audio source that is outputting audio, the method comprising:
    streaming media to one or more audio sources;
    receiving, from a portable electronic device, position coordinates related to a position of the portable electronic device and a fingerprint representing an audio sample;
    searching for available audio sources of the one or more audio sources within a predefined range of said position coordinates by utilizing the received position coordinates;
    determining a list of available audio sources of the one or more audio sources within the predefined range of said position coordinates;
    comparing the received fingerprint with fingerprints of corresponding audio samples of the determined list of available audio sources; and
    in response to finding a match between the received fingerprint and any one of the fingerprints of the corresponding audio samples of the determined list of available audio sources:
        identifying a corresponding audio source; and
        sending, to the portable electronic device, a first data message comprising information related to the corresponding audio source.

2. The method of claim 1, wherein receiving said position coordinates and the fingerprint comprises receiving a second data message from the portable electronic device, said second data message including said position coordinates and the fingerprint.

3. The method of claim 1, wherein identifying the corresponding audio source comprises determining which audio source of the audio sources of the determined list of available audio sources is closest to the portable electronic device.

4. The method of claim 1, wherein the first data message comprises the list of available audio sources of the one or more audio sources within the predefined range of said position coordinates.

5. A computer server of a media streaming service, comprising:
    a receiver;
    a transmitter;
    at least one processor; and
    a storage device comprising instructions executable by the at least one processor to cause the computer server to:
    stream media to one or more audio sources;
    receive, using the receiver, from a portable electronic device, position coordinates related to a position of the portable electronic device and a fingerprint representing an audio sample;
    search for available audio sources of the one or more audio sources within a predefined range of said position coordinates by utilizing the received position coordinates;
    determine a list of available audio sources of the one or more audio sources within the predefined range of said position coordinates;
    compare the received fingerprint with fingerprints of corresponding audio samples of the determined list of available audio sources; and
    in response to finding a match between the received fingerprint and any one of the fingerprints of the corresponding audio samples of the determined list of available audio sources:
    identify a corresponding audio source; and
    send, to the portable electronic device using the transmitter, a first data message comprising information related to the corresponding audio source.

6. The computer server of claim 5, wherein receiving said position coordinates and the fingerprint comprises receiving a second data message from the portable electronic device, said second data message including said position coordinates and the fingerprint.

7. The computer server of claim 5, wherein identifying the corresponding audio source comprises determining which audio source of the audio sources of the determined list of available audio sources is closest to the portable electronic device.

* * * * *

UNITED STATES PATENT AND TRADEMARK OFFICE
CERTIFICATE OF CORRECTION

PATENT NO. : 9,904,506 B1  
APPLICATION NO. : 15/352444  
DATED : February 27, 2018  
INVENTOR(S) : Jehan Page 1 of 1

It is certified that error appears in the above-identified patent and that said Letters Patent is hereby corrected as shown below:

On the Title Page

In the Abstract (57), Column 2 Lines 4-5, please delete "computer program that" and insert --computer programs that--.

Signed and Sealed this  
First Day of May, 2018

Andrei Iancu  
*Director of the United States Patent and Trademark Office*